US012755278B2

(12) United States Patent
Underhill et al.

(10) Patent No.: US 12,755,278 B2
(45) Date of Patent: Oct. 6, 2026

(54) METHOD AND SYSTEM FOR PERFORMANCE ENHANCED HIERARCHICAL KEY DISTRIBUTION SYSTEM

(71) Applicants: John Gregory Underhill, Ottawa (CA); Stiepan Aurelien Kovac, Geneva (CH)

(72) Inventors: John Gregory Underhill, Ottawa (CA); Stiepan Aurelien Kovac, Geneva (CH)

( * ) Notice: Subject to any disclaimer, the term of this patent is extended or adjusted under 35 U.S.C. 154(b) by 0 days.

(21) Appl. No.: 18/228,660

(22) Filed: Jul. 31, 2023

(65) Prior Publication Data

US 2024/0161104 A1 May 16, 2024

Related U.S. Application Data

(60) Provisional application No. 63/469,357, filed on May 26, 2023, provisional application No. 63/454,660, filed on Mar. 25, 2023, provisional application No. 63/427,885, filed on Nov. 24, 2022.

(51) Int. Cl.
*G06Q 20/38* (2012.01)
*H04L 9/40* (2022.01)

(52) U.S. Cl.
CPC ....... *G06Q 20/3829* (2013.01); *H04L 63/064* (2013.01)

(58) Field of Classification Search
None
See application file for complete search history.

(56) References Cited

U.S. PATENT DOCUMENTS

| | | | | |
|---|---|---|---|---|
| 10,909,544 | B1 * | 2/2021 | Osborn | G06Q 20/3278 |
| 2015/0262180 | A1 * | 9/2015 | Hambleton | G06Q 20/3821 705/44 |
| 2017/0032369 | A1 * | 2/2017 | Hugot | G06Q 20/3825 |
| 2021/0036856 | A1 * | 2/2021 | Wang | H04L 9/3213 |
| 2021/0058242 | A1 * | 2/2021 | Donsomsakunkij | G06F 21/602 |
| 2025/0232296 | A1 * | 7/2025 | Maddocks | G06Q 20/401 |

OTHER PUBLICATIONS

Pierre Girard et. al., "A new Payment Protocol over the Internet", 2010 (Year: 2010).*

* cited by examiner

*Primary Examiner* — Patrick Mcatee
*Assistant Examiner* — Timothy Paul Sax
(74) *Attorney, Agent, or Firm* — Goodwin Procter LLP

(57) ABSTRACT

A "hierarchical symmetric key distribution" method, system, and apparatus ("HKDS") is provided for a scalable and fundamentally secure solution for a security protocol for financial transactions, including the electronic payment industry. The security protocol can be used in conjunction with various message authentication code generators and extended output functions to derive unique symmetric keys which can be used to protect messaging and communications in the financial services industry. The security protocol, for example, provide a distributed key management protocol that generates unique transaction keys from a base terminal key, such that the terminal does not retain information that could be used to reconstruct the key once the transaction has been completed, the capture of the terminals state does not provide enough information to construct future derived keys, and the server can reconstruct the transaction key using a bonded number of cryptographic operations.

5 Claims, 19 Drawing Sheets

1300

| Vector | 128-bit` | 256-bit | 512-bit |
|---|---|---|---|
| BDK 110 | 16 | 32 | 64 |
| STK 120 | 16 | 32 | 64 |
| KID 130 | 4 | 4 | 4 |

FIG. 1

| 210 | 220 | 230 |
|---|---|---|
| Master Key ID<br>4 bytes | Device Identity<br>8 bytes | Transaction Counter<br>4 bytes |

FIG. 2

| | | | |
|---|---|---|---|
| Protocol ID<br>1 byte | Device Mode<br>1 byte | Manufacturer ID<br>2 bytes | Device ID<br>4 bytes |

FIG. 3

400

| Data Name | Data Type | Bit Length | Function |
|---|---|---|---|
| flag | hkds_packet_type | 0x08 | The type of packet |
| protocol | hkds_protocol_id | 0x08 | The protocol id |
| sequence | Uint64 | 0x40 | The packet sequence number |
| length | Uint64 | Variable | The packet size including header |

FIG. 4

500

| Flag<br>1 byte | Protocol ID<br>1 byte | Packet Sequence<br>1 byte | Packet Size<br>1 byte |
|---|---|---|---|
| Message<br>Maximum 64 bytes | | | |

FIG. 5

600

| Flag | Protocol ID | Packet Sequence | Packet Size |
|---|---|---|---|
| 0x01 | 0x09\|0x0A\|0x0B | 0x01 | 20 bytes |
| KSN<br>16 bytes | | | |

FIG. 6

700

| Flag | Protocol ID | Packet Sequence | Packet Size |
|---|---|---|---|
| 0x02 | 0x09\|0x0A\|0x0B | 0x02 | 36/52/84 bytes |
| Encrypted Token<br>{ 32, 48, 80 } bytes | | | |

FIG. 7

800

| Flag | Protocol ID | Packet Sequence | Packet Size |
|---|---|---|---|
| 0x03 | 0x09\|0x0A\|0x0B | 0x01 | 36/52 bytes |
| KSN – 16 bytes<br>Encrypted Message – 16 bytes<br>[Optional] Authentication tag – 16 bytes | | | |

FIG. 8

900

| Flag | Protocol ID | Packet Sequence | Packet Size |
|---|---|---|---|
| 0x04 | 0x09\|0x0A\|0x0B | 0x02 | 20 bytes |
| Server Response – 16 bytes | | | |

FIG. 9

1000

| Flag | Protocol ID | Packet Sequence | Packet Size |
|---|---|---|---|
| 0x05 | 0x09\|0x0A\|0x0B | 0x00-0x03 | 6 bytes |
| Administrative Message Code – 2 bytes | | | |

FIG. 10

1100

| Flag | Protocol | Packet | Packet Size |
|---|---|---|---|
| 0xFF | 0x09\|0x0A\|0x0B | 0x1F-0xFF | 20 bytes |
| Error Message – 16 bytes | | | |

FIG. 11

1200

| Message Name | Numerical Value | Message Purpose |
|---|---|---|
| Synchronize Token | 0x01 | Sent by the client in the event that a token key received from the server fails an authentication check, and is rejected by the client. This message triggers an increment of the transaction counter on the client by the key cache size, and the amended KSN is sent along with a new token request. |
| Reinitialized Token | 0x02 | This message is the server's [optional] response to the client token key rejection, acknowledging a new token is being constructed. The maximum concurrent token re-initialization requests are **3**, after three attempts the server **SHALL** consider the client device compromised and ignores all subsequent transactions, until a client re-initialization has been performed.<br>The server **SHALL** log all client token rejections, and if tokens are rejected beyond a weighted-fair threshold, the client should be disconnected and assumed to be compromised. For example, if within 1000 requests, there are 6 token failures, the server should consider the device or communications channel as compromised, and raise and administrative alert. If after 1000 successful token exchanges have occurred, the failed token counter is reset to zero. |
| Token Requests Exceeded | 0x03 | In the event that the maximum number of token failures have occurred within a given threshold, the server will send the token-request exceeded message to the client. Upon receiving this notification, the terminal device **SHALL** enter a state of 'error condition', whereby, the terminal ceases all transactions capabilities, and awaits a remote reset |
| Remote Reset | 0x04 | The server can send a remote reset to the client terminal, only if the terminal is in an 'error condition' state. The remote reset purges the current key cache, incrementing the transaction counter to the state of the new cache cycle. The client then sends a new token request packet, generates a new transaction key cache, and resynchronizes with the server. |
| Diagnostic | 0x05 | The server can request a diagnostic output from the terminal's hardware components. This output should be encrypted by using an available key in the cache to key the PRF, generate a key-stream, and use the pseudo-random output to encrypt (XOR) the diagnostic output. |
| Reserved | 0x06 | |
| Reserved | 0x07 | |
| Reserved | 0x08 | |

FIG. 12

| Constant Name | Value | Description |
|---|---|---|
| HKDS_CACHE_MULTIPLIER | 4 | The cache multiplier, the key cache total byte size is a multiple of this value times the output size of the PRF function. |
| HKDS_DID_SIZE | 12 | The size of the device identity string, 12 bytes. |
| HKDS_KID_SIZE | 4 | The size of the master key identity string, 4 bytes. The KID is part of the device identity string, and the MDK. |
| HKDS_KSN_SIZE | 16 | The size of the key serial number, 16 bytes. The key serial number is comprised of the device identity string, and the transaction key counter. |
| HKDS_MESSAGE_SIZE | 16 | The size of the HKDS encrypted message output, 16 bytes. |
| HKDS_NAME_SIZE | 7 | The size of the HKDS implementation name string, 7 bytes. The name string is a component in the CTOK token string. |
| HKDS_TKC_SIZE | 4 | The size of the key transaction counter, 4 bytes. |
| HKDS_TAG_SIZE | 16 | The size of the KMAC authentication tag, 16 bytes. |
| HKDS_SHAKE_XXX | 0x09-0x0B | The SHAKE security mode used by the HKDS implementation. Possible values are: 128=0x09, 256=0x0A, 512=0x0B. |
| HKDS_CTOK_SIZE | 23 | The byte length of the custom token string CTOK. |
| HKDS_NAME_SIZE | 7 | The byte length of the HKDS implementations formal name |
| HKDS_PRF_RATE | 168, 136, 72 | The rate size of the SHAKE permutation function. Possible values are 168 for 128-bit security, 136 for 256-bit security, and 72 for 512-bit security setting. |
| HKDS_EDK_SIZE | 16, 32, 64 | The byte length of the embedded device key, corresponding to the HKDS security mode setting; 128-bit, 256-bit, or 512-bit security. |
| HKDS_FORMAL_NAME | 0x48, 0x4B, 0x44, 0x53, ... | The HKDS implementation name. The ascii name that represents the formal name of the HKDS implementation based on the security mode: HKDSXXX, where XXX represents the security level, 128, 256, or 512. |
| HKDS_MAC_NAME | 0x75, 0x48, 0x77, 0x4A, ... | The formal string name of the MAC function used to authenticate messages. |
| HKDS_TMS_SIZE | 23 | The byte size of the token MAC string |

FIG. 20 2000

| State Member Name | Value Type | Description |
|---|---|---|
| KTC | Array; 4 bytes. | The key transaction counter. A monotonic big-endian aligned counter, incremented each time a transaction key is extracted from the key cache. This array is a part of the KSN. |
| KID | Array; 4 bytes. | The master key identity. Used by the server to identify the master key associated with the device. |
| DID | Array; 12 bytes. | The device identity string. A unique string that identifies both the client terminal, and the clients master key. This array is part of the KSN. |
| KSN | Array 16 bytes. | The KSN combines the master key identity (KID), the device identity (DID), and the key transaction counter (KTC), into a single array that comprises the key serial number. |
| EDK | Array; 16,32,64 bytes. | The embedded device key. This key is stored in the SCD, and cannot be changed. The EDK size is determined by the security level of the HKDS implementation; 128, 256, and 512-bits, for 16, 32, and 64-byte key sizes. |
| TKC | Multidimensional byte array; variable size. | The transaction key cache; holds a number of 16-byte transaction keys, used to encrypt messages sent to the server and key the MAC function. The size of the key cache is dependent on the security configuration and the key cache multiplier setting. |
| Cache Empty | Boolean; cache state. | Indicates the key cache state readiness. |

FIG. 21 2100

| State Member Name | Value Type | Description |
|---|---|---|
| KID | Array; 4 bytes. | The master key identity. Used to select the master key associated with a client device. |
| STK | Array; 16, 32, 64 bytes. | The secret token key array. The secret token key is used as a base key that is the combined with the custom token string (CTOK), to derive unique secret tokens sent to the client. |
| BDK | Array; 16, 32, 64 bytes. | The base derivation key. The base derivation key is combined with the client's device identity, to create the client's embedded device key (EDK). |

FIG. 22 2200

| State Member Name | Value Type | Description |
|---|---|---|
| Rate | Unsigned integer constant. | The rate is the byte rate at which the underlying pseudo random function (SHAKE), performs permutations and the pseudo-random output size of the permutation. |
| Count | Unsigned integer constant. | The client's transaction key counter. Used to select the correct key from the reconstructed client key cache. |
| MDK | Structure; variable size. | The master derivation key structure associated with the client device. |
| KSN | Array 16 bytes. | The KSN combines the master key identity (KID), the device identity (DID), and the key transaction counter (KTC), into a single array that comprises the key serial number. |

FIG. 23 2300

| Constant Name | Value | Description |
|---|---|---|
| HKDS_CACHE_MULTIPLIER | 4 | The cache multiplier; key cache total byte size is a multiple of this value times the output size of the SHAKE PRF function. |
| HKDS_DID_SIZE | 12 | The size of the device identity string, 12 bytes. |
| HKDS_KID_SIZE | 4 | The size of the master key identity string, 4 bytes. The KID is part of the device identity. |
| HKDS_KSN_SIZE | 16 | The size of the key serial number, 16 bytes. The key serial number is comprised of the device identity string, and the transaction key counter. |
| HKDS_MESSAGE_SIZE | 16 | The size of the HKDS encrypted message output, 16 bytes. |
| HKDS_NAME_SIZE | 7 | The size of the HKDS implementation name string, 7 bytes. The name string is a component in the CTOK token string. |
| HKDS_TKC_SIZE | 4 | The size of the key transaction counter, 4 bytes. |
| HKDS_TAG_SIZE | 16 | The size of the KMAC authentication tag, 16 bytes. |
| HKDS_SHAKE_XXX | 0x09-0x0B | The SHAKE security mode used the HKDS implementation. Possible values are 128=0x09, 256=0x0A, 512=0x0B. |
| HKDS_CTOK_SIZE | 23 | The byte length of the custom token string CTOK. |
| HKDS_NAME_SIZE | 7 | The byte length of the HKDS implementations formal name. |
| HKDS_PRF_RATE | 168, 136, 72 | The rate size of the SHAKE permutation function. Possible values are 168 for 128-bit security, 136 for 256-bit security, and 72 for 512-bit security setting. |
| HKDS_EDK_SIZE | 16, 32, 64 | The byte length of the embedded device key, corresponding to the HKDS security mode setting: 128-bit, 256-bit, or 512-bit security. |
| HKDS_FORMAL_NAME | 0x48, 0x4B, 0x44, 0x53… | The HKDS implementation name. The ascii name that represents the formal name of the HKDS implementation based on the security mode: HKDSXXX where XXX represents the security level, 128, 256, or 512. |
| HKDS_MAC_NAME | 0x75, 0x4B, 0x77, 0x65… | The formal string name of the MAC function used to authenticate messages. |
| HKDS_TMS_SIZE | 23 | The byte size of the token MAC string. |
| HKDS_KECCAK_HALF_ROUNDS | N/A | Sets the Keccak permutation function at half rounds (12 vs 24) for a high-performance implementation. |

FIG. 24 2400

| Data Name | Data Type | Bit Length | Function |
|---|---|---|---|
| ksn | Uint64 2D Array | Variable | The client's key serial number 2d array |
| mdk | hkds_master_key | 0x40 | A pointer to the master derivation key struct |

FIG. 25 2500

| Data Name | Data Type | Bit Length | Function |
|---|---|---|---|
| tag | Uint8 Pointer | 0x40 | The tag associated with this queue |
| state | qsc_queue_state | Variable | The queue state context |

FIG. 26 2600

| Task | HKDS-128 | HKDS-256 | DUKPT-128 | DUKPT-256 |
|---|---|---|---|---|
| Decryption | 1761 | 1675 | 12013 | 22534 |
| Encryption | 101 | 102 | 4226 | 11686 |
| Encrypt-Auth | 1461 | 1479 | 13276 | 26139 |
| Decrypt-Verify | 3545 | 3548 | 27733 | 48615 |

FIG. 27 2700

| Task | HKDS-128 | HKDS-256 | DUKPT-128 | DUKPT-256 |
|---|---|---|---|---|
| Decryption | 1866 | 1751 | 7414 | 11615 |
| Encryption | 96 | 112 | 2497 | 4495 |
| Encrypt-Auth | 1404 | 1475 | 10413 | 14188 |
| Decrypt-Verify | 3683 | 3563 | 19071 | 27094 |

FIG. 28 2800

| Task | HKDS-128 | HKDS-256 | PHKDS-128 | PHKDS-256 |
|---|---|---|---|---|
| Decryption | 1.353 | 1.268 | 0.833 | 0.796 |
| Encryption | 0.112 | 0.119 | 0.069 | 0.080 |
| Decrypt-Verify | 2.545 | 2.480 | 1.546 | 1.495 |
| Encrypt-Auth | 0.668 | 0.673 | 0.389 | 0.388 |

FIG. 29 2900

METHOD AND SYSTEM FOR PERFORMANCE ENHANCED HIERARCHICAL KEY DISTRIBUTION SYSTEM

CROSS-REFERENCE TO RELATED APPLICATION(S)

This application claims priority to (i) U.S. Provisional Patent Application Ser. No. 63/427,885, entitled "P-HKDS PERFORMANCE ENHANCED HIERARCHAL SYMMETRIC KEY DISTRIBUTION SYSTEM," filed on Nov. 24, 2022, (ii) French Provisional Application/Enveloppe s-Soleau Deposit No. DSO2022016089, filed on Nov. 16, 2022, (iii) U.S. Provisional Patent Application Ser. No. 63/454,660, entitled "METHOD AND SYSTEM FOR PERFORMANCE ENHANCED HIERARCHICAL KEY DISTRIBUTION SYSTEM," filed on Mar. 25, 2023, and (iv) U.S. Provisional Patent Application Ser. No. 63/469,357, entitled "METHOD AND SYSTEM FOR PERFORMANCE ENHANCED HIERARCHICAL KEY DISTRIBUTION SYSTEM," filed on May 26, 2023, each of these provisional applications being incorporated herein in its entirety by reference hereto.

COPYRIGHT AND TRADEMARK NOTICE

Portions of the disclosure in this patent application contain material which is subject to copyright and/or trademark protection. The patent application owner has no objection to the facsimile reproduction of the published patent application or any resulting granted patent, as it appears in the U.S. Patent and Trademark Office records, but otherwise reserves all copyright and trademark rights whatsoever throughout the world.

FIELD OF INVENTION

The present invention relates to a system, method, and apparatus for hierarchal symmetric key distribution. More specifically, the present invention relates to a system, method, and apparatus for creating a secure method of communication using a hierarchal symmetric key distribution as described herein.

BACKGROUND

Secure communications, including secure distribution, is a constant challenge in the financial services industry. Large amounts of computer processors engage in communications with one or more servers, or other processing devices, in order to conduct financial transactions each day. These numbers continue to grow each year. Given the increased use of online banking, money transfer apps, and other commercially and personal online electronic digital payment transactions, there is a need for more secure, yet accessible and non-cumbersome, communications.

Such increase in digital financial transactions has necessitated continual improvements in security of electronic communications. The increase in secure transfers of financial transactions and information via electronic digital communications includes the transfer of currency information between bank servers and point of sale devices. Such rapid increase in electronic digital communications led to the need to initially employ and still use older working protocols. Such protocols are found to be computationally expensive and of limited scalability.

One such protocol is distributed unique key per transaction ("DUKPT"), originally developed as a remote payment system by VISA, in the 1980's. in the early days, DUKPT was an effective way to check credit availability via a modem and terminal, and limited in use to just a select set of vendors using such equipment. As time progressed, the financial industry increased its online presence with the use of debit/credit cards, and later banking apps, among others, allowing for alternative methods of payment by consumers for goods and services. Presently, in many locations throughout the world, consumers use electronic payment systems more often than previous forms of payment including checks, money orders, and even paper currency.

Even though the use of electronic payment systems has increased exponentially, the use of essentially decades-old security system protocols continues. Accordingly, there exists a need for a protocol addressing improved scalability, complexity, and other security features.

SUMMARY

Embodiments of the present invention provide a method, system, and apparatus for security protocol for financial transactions. Embodiments of the present invention provide for a replacement protocol of DUKPT, which is more scalable to meet the ever-increasing needs of the electronic payment industry. For example, embodiments of this new protocol is authenticated, capable of up to 512-bit security, providing a fundamentally more secure architecture than DUKPT. For example, embodiments of this new protocol can be scaled to the massive demands expected in the future. For example, embodiments of this new protocol have been found to outperform DUKPT by huge margins, and thus, presently may reduce required transaction infrastructure costs by as much as seventy-five percent. Embodiments of the present invention provide more effective remote financial transaction security. Embodiments of the present invention are referred herein as the "hierarchal symmetric key distribution" system, method, and apparatus ("HKDS").

Embodiments of the present invention provide for a distribution key management protocol which can be used in conjunction with the Keccak family of message authentication code generators ("KMAC"), and extended output functions ("SHAKE"), to derive unique symmetric keys which can be used to protect messaging and communications in the financial services industry. For example, the security of a distributed key method involves the secure derivation of transaction keys which are used to encrypt a message cryptogram.

Embodiments of the present invention provide a distributed key management protocol that generates unique transaction keys from a base terminal key, such that the terminal does not retain information that could be used to reconstruct the key once the transaction has been completed (i.e., forward security); the capture of the terminals state does not provide enough information to construct future derived keys (i.e., predicative resistance); and the server can reconstruct the transaction key using a bonded number of cryptographic operations.

Embodiments of the present invention provide a two-key system protocol. For example, an embedded key on the client side is used to encrypt token exchanges and as a portion of the key used to generate the transaction key cache. In addition, a token key is used as an ephemeral key derived by the server, encrypted and sent to the client side, as the second part of the key used to initialize the PRF that generates the transaction key cache.

Embodiments of the present invention provide for several advantages to using two keys in the described manner. The client's embedded device key need never be updated, the base token key can be updated instead, to inject new entropy into the system. The client can produce a practically unlimited number of derived transaction keys, there is no upper limit, so long as the base token key is periodically refreshed (after many thousands of token derivations, or millions of transactions). This method provides both forward secrecy, and predictive resistance. Even if the client's state is captured, the adversary will not be able to derive past key caches from the information contained in the state. The adversary will not be able to derive future key caches based on the captured state alone. The client's key can be changed, without changing the embedded key itself (which is usually stored in a tamper-proof module, and can only be changed via direct access to the terminal). The client's master key identity can be changed instead, pointing to a different master key, that derives the same embedded device key, but uses a different base secret token key.

Embodiments of the present invention provide for a highly efficient secure transactions protocol, found to be outperforming DUKPT-AES by 4 times the decryption speed with a 128-bit key, to as much as 8 times faster than DUKPT using a 256-bit key. Embodiments of the present invention provide for a highly efficient secure transactions protocol using embedded Keccak CPU instructions.

Embodiments of the present invention provide for implementation with 128, 256, and 512-bit security settings. Embodiments of the present invention provide for use of strong NIST standardized (KMAC) authentication and SHAKE for key derivation.

BRIEF DESCRIPTION OF THE DRAWINGS

FIG. 1 shows an example master key component array according to an embodiment of the present invention.

FIG. 2 shows an example key serial number structure according to an embodiment of the present invention.

FIG. 3 shows an example device identity structure according to an embodiment of the present invention.

FIG. 4 shows an example hierarchal symmetric key distribution packet header structure according to an embodiment of the present invention.

FIG. 5 shows an example message packet structure according to an embodiment of the present invention.

FIG. 6 shows an example client token packet structure according to an embodiment of the present invention.

FIG. 7 shows an example server token response packet structure according to an embodiment of the present invention.

FIG. 8 shows an example client request message packet structure according to an embodiment of the present invention.

FIG. 9 shows an example server message response structure according to an embodiment of the present invention.

FIG. 10 shows an example administrative message packet structure according to an embodiment of the present invention.

FIG. 11 shows an example error message packet structure according to an embodiment of the present invention.

FIG. 12 shows example packet header message types according to an embodiment of the present invention.

FIG. 20 shows example hierarchal symmetric key distribution client constants according to an embodiment of the present invention.

FIG. 21 shows example hierarchal symmetric key distribution client states according to an embodiment of the present invention.

FIG. 22 shows example server state members according to an embodiment of the present invention.

FIG. 23 shows example hierarchal symmetric key distribution server states according to an embodiment of the present invention.

FIG. 24 shows example hierarchal symmetric key distribution server constants according to an embodiment of the present invention.

FIG. 25 shows an example hierarchal symmetric key distribution parallel state structure according to an embodiment of the present invention.

FIG. 26 shows an example hierarchal symmetric key distribution queue state according to an embodiment of the present invention.

FIG. 27 shows example hierarchal symmetric key distribution performance benchmarks in comparison with the DUKPT-AES system according to an embodiment of the present invention.

FIG. 28 shows example hierarchal symmetric key distribution performance benchmarks in comparison with DUKPT-AESNI system according to an embodiment of the present invention.

FIG. 29 shows example hierarchal symmetric key distribution performance benchmarks according to an embodiment of the present invention.

DETAILED DESCRIPTION

Figure 13:
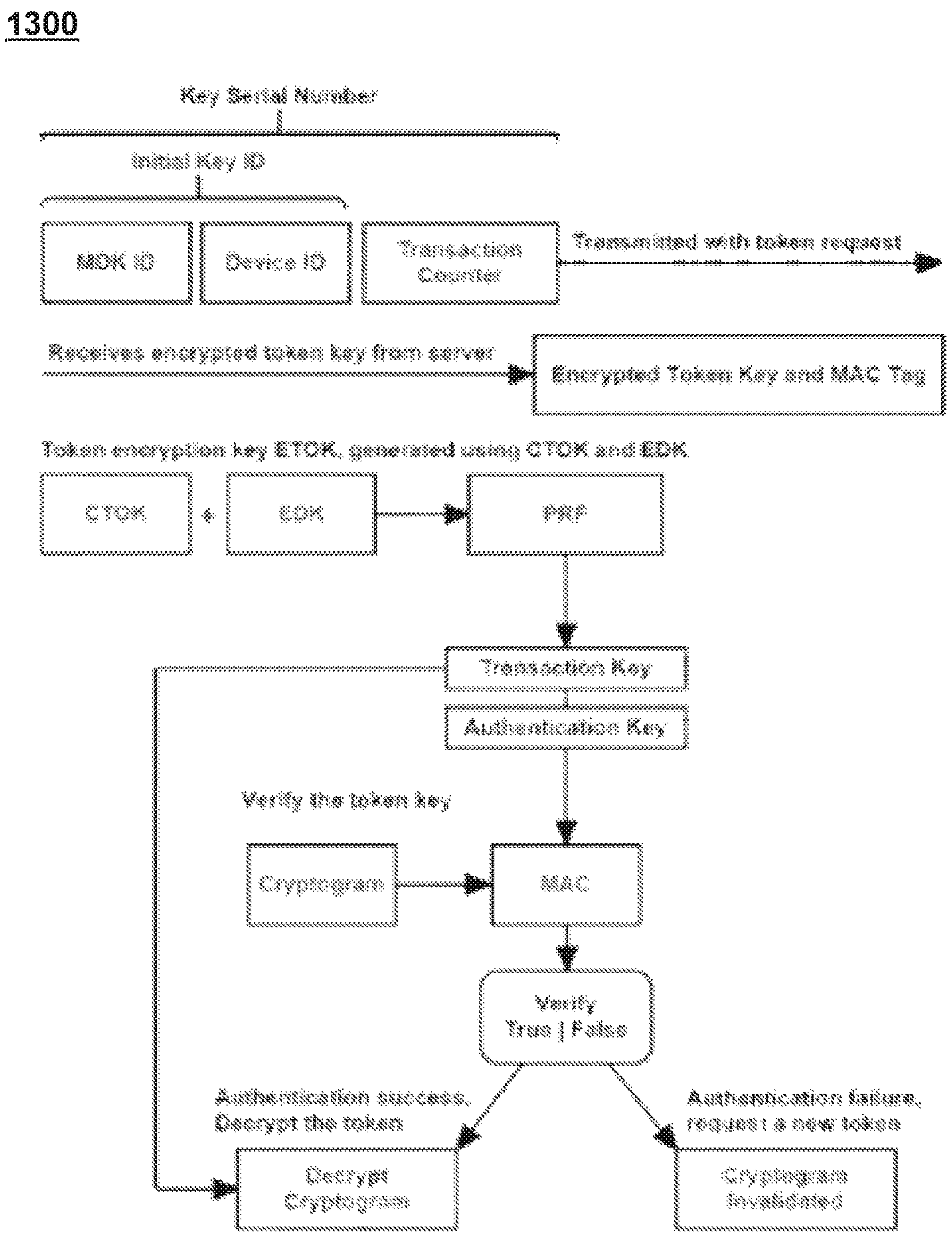
FIG. 13 shows an example hierarchal symmetric key distribution client device initialization according to an embodiment of the present invention.

The various embodiments described and illustrated are for the purpose of showing some example embodiments of the present invention and are not intended to limit in any way the scope of the present invention.

Embodiments of the present invention provide an HKDS key distribution protocol, which is used to derive per transaction unique keys from an initial embedded device key on a terminal and recreate that transaction key on a transaction processing server. Embodiments of the present invention provide for generation of these unique keys on the terminal, the authentication of cryptograms encrypted with those keys, recreating those keys on the transaction processing server, the verification of cryptogram messages, and the messaging protocol used to transmit keys and messages between the terminal client and transaction server.

Embodiments of the present invention provide for a protocol intended for institutions that implement distributed key systems to encrypt and authenticate secret information exchanged between remote terminals and transaction processing servers, such as ATMs, point-of-sale devices, or other technology commonly employed by the financial services industry that are used for remote payment transactions.

Embodiments of the present invention provide for key derivation functions, authentication and encryption of messages, and message exchanges between terminals and transaction servers elements in the construction of an HKDS key distribution system.

Embodiments of the present invention provide for a master derivation key ("MDK"). The master key (MDK) is comprised of three unique byte arrays: The Base Derivation Key (BDK), this is the key that is distributed to the point-of-sale manufacturers, and used to generate a unique embedded device key (EDK) for each device. The Secret Token Key (STK), this is a secret key, known only to the transaction server; a derivation of this key is mixed with the devices embedded device key to seed the PRF which generates the transaction key cache. The Key Identity, this is a 4-byte unique id number that is sent as part of the key serial number during a transaction request, and is used to identify the master key.

For example, the Key sizes are variable according to the desired security strength of the implementation. Both the base derivation key, and the secret token key are set to that security level. HKDS has three possible security levels, 128, 256, and 512-bit security. The key size values illustrated are in bytes; 8-bit unsigned integers.

For example, in an embodiment, a CHECKSUM functionality is provided. The reference implementation has the said hash value shown in: developer@mail:~/Documents/itk.swiss$ sha256sum../../Downloads/HKDS.zip and b89b017daf4481b36e2467bd5098607033f07d8da64ac6effe 8c2377d81ffe58../../Downloads/HKDS.zip, each of which is incorporated herein in its entirety by reference hereto.

FIG. 1 shows a table of a master key component array byte sizes per the security level implemented. For example, BDK 110, STK 120, and KID 130 are shown for each of 128-bit, 256-bit and 512-bit. The hkds_master_key includes the master key structure.

FIGS. 2 and 3 show tables concerning the key serial number. The key serial number (KSN) is sent by the client along with an encrypted message to the transaction processing server. The KSN is a multi-part 16-byte array, consisting of the master key id (KID) 210, the devices identity string (DID) 220, and the key transaction counter (KTC) 230. The KID 210 is a 4-byte unique identification number that corresponds to a master key. The DID 220 is comprised of four parts; a 1-byte protocol id number, a 1-byte device mode number, a 2-byte manufacturer id, and a 4-byte unique device identification number. The transaction counter, is a 4-byte unsigned monotonic counter that represents the number of transactions processed by that device at the time of transmission.

Example protocol ID possible values include: standard encryption mode: 0x10 (17); authenticated encryption mode using KMAC: 0x11 (18); and authenticated encryption mode using SHA3: 0x12 (19). The protocol ID reflects a versioning number as well as the base encryption mode (authenticated or standard encryption mode). Future revisions of the protocol will reflect a change in this numbering, with subsequent revisions incrementing these values in an extended numbering from this base protocol specification.

Example Device Mode possible values include: 1) SHAKE-128 PRF mode: 0x09 (9); 2) SHAKE-256 PRF mode: 0x0a (10); and 3) SHAKE-512 PRF mode: 0x0b (11). The device mode identifier indicates the primary pseudo random function (PRF) used in the encryption and derivation-key generation functions. Additions of alternate PRF functions shall be added to subsequent versions of the protocol incrementing the device mode identifier from these base values.

The manufacturer identity string is assigned to the point-of-sale device manufacturer, this is a unique identifying number, that shall not be assigned to any other device manufacturer. The manufacturer ID shall be a statically assigned identifier indicating the point-of-sale device's manufacturing company, this value shall not be changed, and can only be reassigned through general industry consensus and in the event the company's ownership or operating status has changed. The two-byte numbering scheme allows for more than 16 thousand uniquely numbered device manufacturers. In the unlikely event this number is exceeded, the first byte of the device identity, may be used to extend the manufacturer's identity address space in a future specification of the protocol as required.

The device ID is a unique identifier that is used to number the point-of-sale device supplied by the point-of-sale ("POS") device manufacturer. This is a monotonic incrementing counter, used to assign a unique identity to each individual POS device. Each device produced shall be programmed with a unique device identity. The same device identity shall not be assigned to more than one device. More than 4 billion devices can be numbered per each device manufacturer. In the event that a manufacturer has exhausted this address space, the manufacturer can begin renumbering again at zero, after first ensuring that earlier devices that may retain this identity, have been removed from service, or, apply for a secondary manufacturing identification number.

FIGS. 4 and 5 show example HKDS packet header structures 400, 500. The hkds_packet_header contains the HKDS packet header structure. The HKDS packet header is 4 bytes in length, and includes the following components: the Flag, the Protocol ID, the Packet Sequence, and the Packet Size. The Flag, the type of message contained in the packet; Token Request (0x01), Token Response (0x02), Message Request (0x03), Message Response (0x04), Administrative Message (0x05), or, an Error Message (0x1F-0xFF). The Protocol ID, this signals the security mode of HKDS being used differentiated by the underlying pseudo-random function; SHAKE-128 (0x09), SHAKE-256 (0x0A), or SHAKE-512 (0x0B). This value shall correspond to the KSN protocol identity (PID). The Packet Sequence, this indicates the sequence number of the packet exchange. The Packet Size, this includes the message header and the message payload.

FIG. 6 shows a client token packet structure 600. The client token request is sent to the server on initialization and subsequently each time the transaction key cache has been exhausted. It includes the client's key serial number (KSN); a concatenation of the master key identity string, the client's unique identification number, and the transaction key counter. The transaction counter, along with the KSN, are used by the server's token authentication mechanism, to generate a unique message authentication code for each token request.

FIG. 7 shows a server token response packet structure 700. The server's response to a token request. This packet contains an encrypted token (ETOK) sent from the server to the client device. The token is the same size as the embedded device key on the client (EDK), plus a MAC authentication tag. A 16-byte authentication code is appended to the encrypted token, which is verified by the client.

FIG. 8 shows a client message packet structure 800. The client's encrypted message request packet. This packet includes 16 bytes of encrypted message and the client's key serial number, and may include the authentication tag as indicated by the Protocol ID flag.

FIG. 9 shows a server message response packet structure 900. The server's plaintext message response, typically a verification response sent to the client terminal that indicates the success or failure of a transaction request. Note that future revisions may append a MAC code used to verify this response.

FIG. 10 shows an administrative message packet structure 1000. An administrative message is used to signal requests, status updates, or as a post-error condition reset of a communications session. These signals invoke specific handling measures by the receiver, can indicate an internal state of the device, and are used for logging or administrative action. See section 5.4: the Administrative Message enumeration for details.

FIG. 11 shows an error message packet structure 1100. An error message indicates a serious failure between the client or server. This message is bi-directional and can be sent by either the client or server. The base error code (0x1F-0xFF) is contained in the sequence number.

FIG. 12 shows example message types that can be used by HKDS 1200.

In the various example embodiments shown in the figures, FIG. 13 shows a flowchart of an example client initialization 1300. The client terminal device must undergo initialization before being ready to process transaction requests. The client begins the initialization by sending a token request packet to the transaction server, requesting an encrypted token key.

This token key is generated by the server, using the secret token key (STK) residing in the associated master derivation key (MDK), stored on the server. The STK from that master key is concatenated with the custom token string (CTOK); the client's unique device identity string (DID), the implementation name, and the token request counter. The concatenated array of CTOK and STK is used to key the PRF.

The transaction counter, is a monotonic counter used by the client to count the number of transaction keys that have been used, this counter is divided by the size of the client's key cache, to calculate the token requests counter; the number of times the client has requested a token from the server. Using this counter as a part of the PRF key, guarantees that a unique token is generated each time, and using the client's unique device identity, guarantees that each token generated by the server using that STK, is unique to the requesting client, so that combined these inputs provide a guarantee that every unique client, will receive a different token, every time a token request is made, while the secret token key, remains known only to the server.

Figure 14:
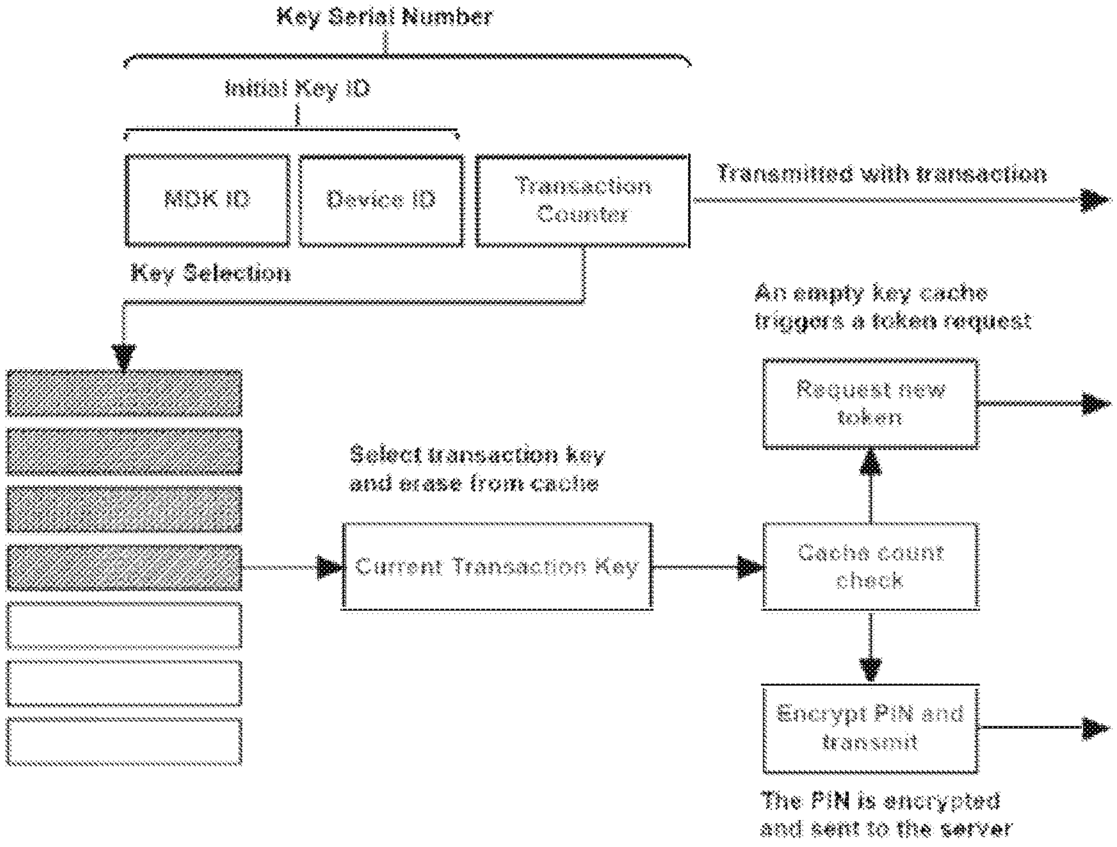
FIG. 14 shows an example hierarchal symmetric key distribution client message encryption according to an embodiment of the present invention.

FIG. 14 shows a flowchart of an example HKDS client message encryption 1400. The client encrypts a message by selecting a transaction key from its internal key cache, using that pseudo-random key in a stream cipher like application, XORing the PIN message with the pseudorandom transaction key to produce the cipher-text. When a transaction key is selected, the cache is first checked for available keys remaining in the cache. If the transaction key cache is empty, the client sends a token request to the server, and rebuilds the key cache before the transaction can begin.

Figure 15:
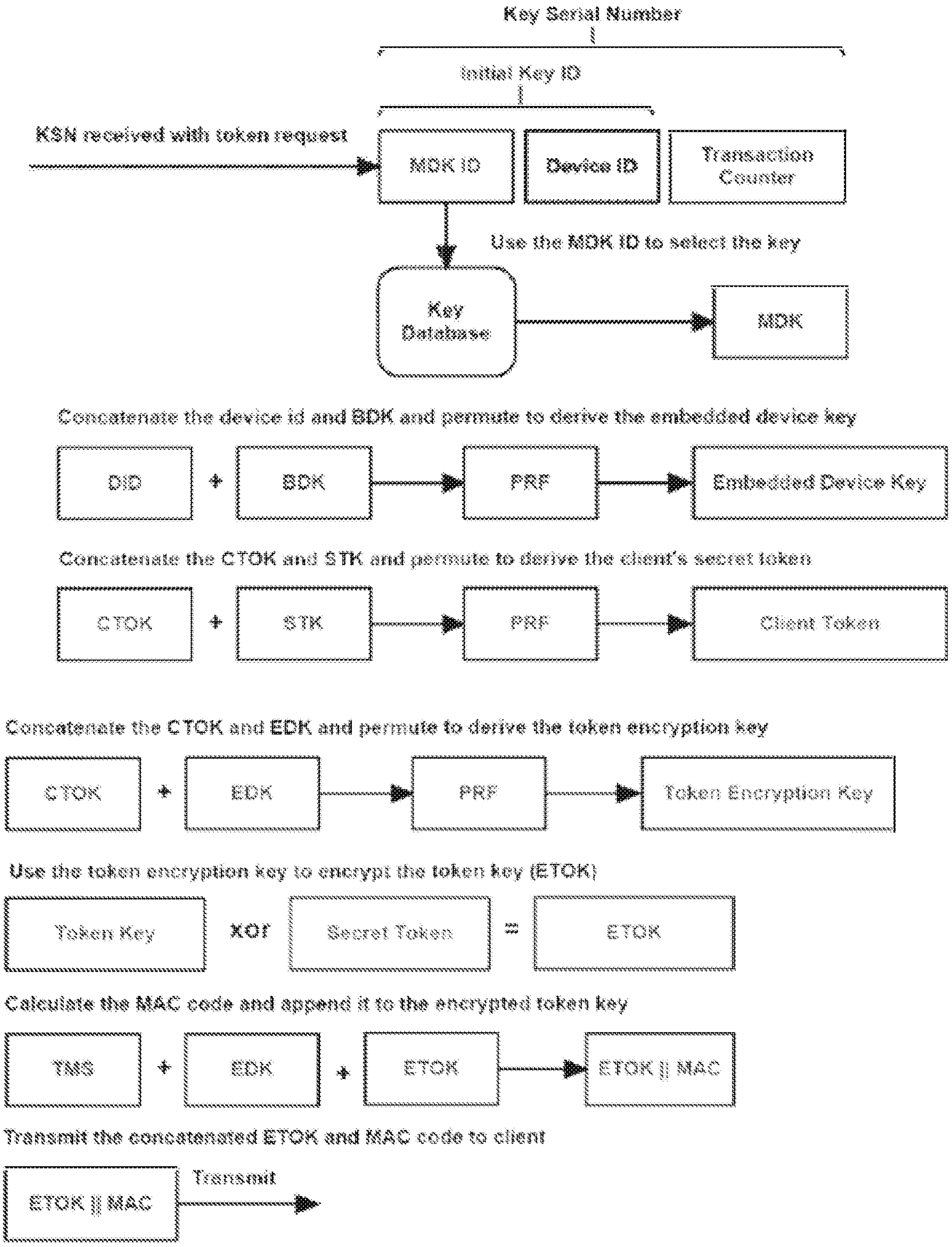
FIG. 15 shows a server token request processing example according to an embodiment of the present invention.

FIG. 15 shows a flowchart of an example server token request processing system 1500. The server derives the client's embedded device key by concatenating the device identity string (DID), and the master key's base derivation key (BDK), and permuting them to derive the EDK. The server generates the client's secret token by concatenating the custom token string (CTOK), and the master key's secret token key (STK), and permuting them to create the token. The token is encrypted with the token encryption key, which is derived by concatenating the custom token string, with the client's EDK, and permuting them to generate the token encryption key. The server then encrypts the token (ETOK) using the token encryption key.

The encrypted token key is then processed by the MAC function, and a 16-byte authentication code is appended to the encrypted token. The MAC state is first initialized to a unique value by hashing a combination of the client's KSN, and the MAC functions formal name (the token MAC string; TSM), then keyed with the EDK, which generates the MAC code using the encrypted token as the message. This generates a unique MAC code for every token generated by the server; the transaction counter in the client's KSN, guarantees that the MAC state will be initialized to a unique value each time. It also serves to authenticate the KSN, along with the encrypted token key.

Figure 16:
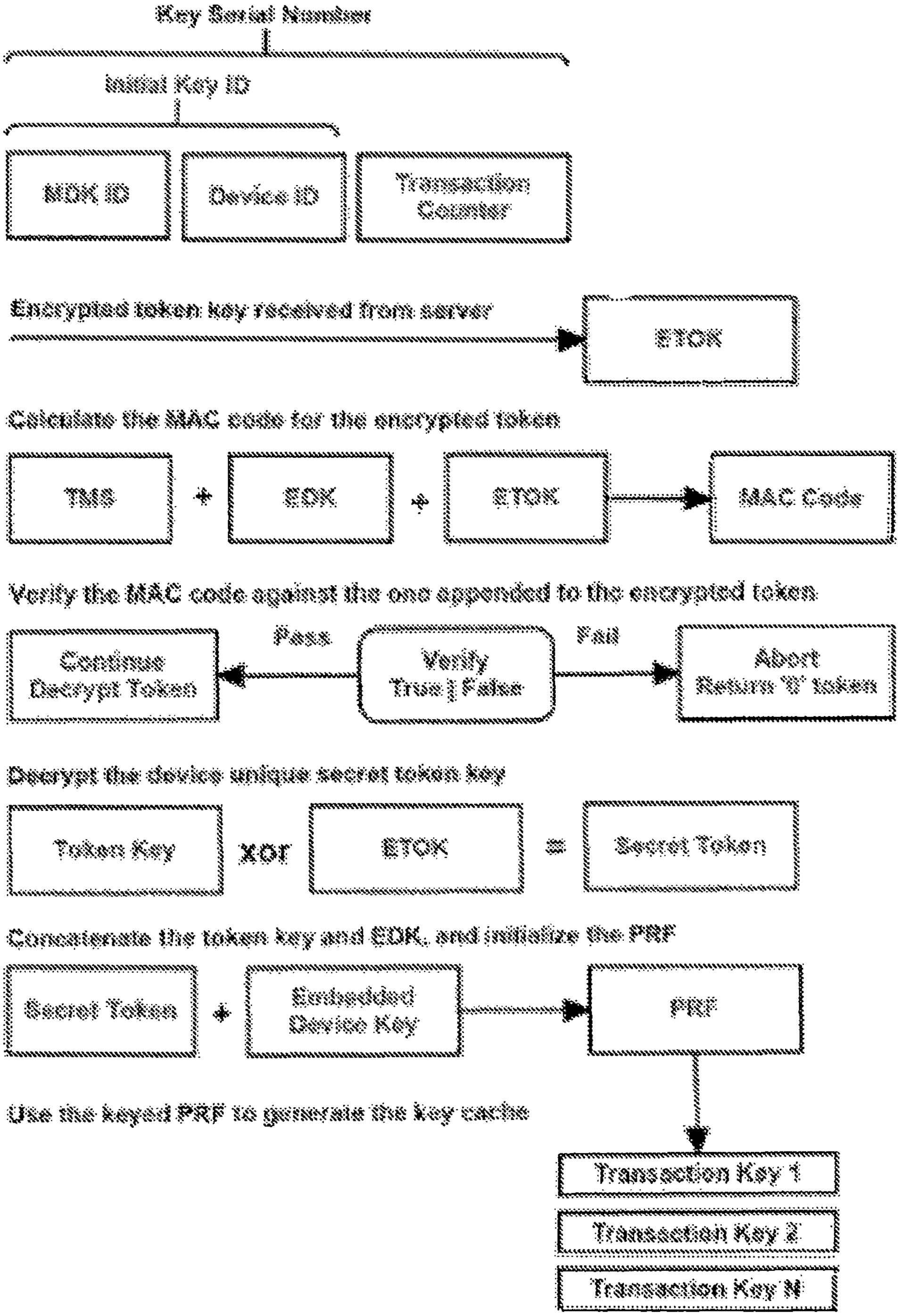
FIG. 16 shows a client key cache generation example according to an embodiment of the present invention.

FIG. 16 shows an example client key cache generation 1600. When the client has received the encrypted token response from the server, it generates a MAC code for the encrypted cipher-text (ETOK). The MAC function is first set to a unique state, using the Token MAC String (TMS). The TMS is a concatenation of the client's KSN and the MAC functions formal name (ex. 'KMAC256'). The TMS string is passed to the KMAC customization parameter, and the client's EDK is used to key KMAC. The encrypted token is passed to KMAC as the message parameter, and a 16-byte MAC codes is generated. This code is compared to the MAC code appended to the encrypted token key. If the MAC codes are identical, the client decrypts the token, and uses it to generate the key cache. If verification fails, the token is zeroed, and the function returns a failure state, and the token request is either sent again to the server up to a maximum retry count, or the client signals a critical failure to the server, and awaits reset.

Once the encrypted token is authenticated successfully, the client then decrypts the token, and concatenates the token with its embedded device key (EDK) to key SHAKE. The SHAKE implementation then 'squeezes' the number of blocks of pseudo-random required to populate the client's key cache.

The SHAKE squeeze function applies a permutation to 1600 bits of state, a portion of that state (2n the desired security size) remains secret, the rest of the state is the pseudo-random output. This allows for a large block of usable pseudo-random output that can be applied to building the key cache, with each call to the underlying permutation function.

Using the 128-bit security setting, 1344 bits (168 bytes) of the state can be used to build keys with each permutation call. 256-bit security produces 1088 bits (136 bytes) of pseudo random, and a 512-bit security setting returns 576 bits (72 bytes) of pseudo random per permutation call.

The HKDS key cache size is calculated using a 2n multiple of these return sizes. This is because PIN message sizes are typically set at 128-bits, or 16 bytes, and 16 bytes fits into 2n Keccak squeeze function return output size evenly. For example, the minimum key cache multiplier is 2, using the 128-bit security setting, 2 calls to the Keccak squeeze function with a rate of 168, returns 336 bytes of usable pseudorandom, or exactly 21*16-byte transaction keys.

The default setting for the cache multiplier is 4, which produces exactly 42 transaction keys with the 128-bit security setting, 34 transaction keys with the 256-bit security setting, or 18 transaction keys with the 512-bit security implementation.

The key-cache multiplier is an implementation definable constant, and can be set by adjusting the HKDS_CACHE_MULTIPLIER constant within the code, but both the client and server must be set to the same multiplier. The valid settings for the key cache multiplier are 2, 4, 6, 8, 10, 12, 14, and 16. Changing the multiplier increases the size of the internal key cache of the client by a factor of 2n the base permutation output size, but this also increases the time required to recreate the client's key cache on the server. Accordingly, this is why the default key cache multiplier has been set to 4, which appears to be a good trade-off between token exchange intervals, and increased latency caused by larger key-cache reconstructions during server-side decryption.

Figure 17:
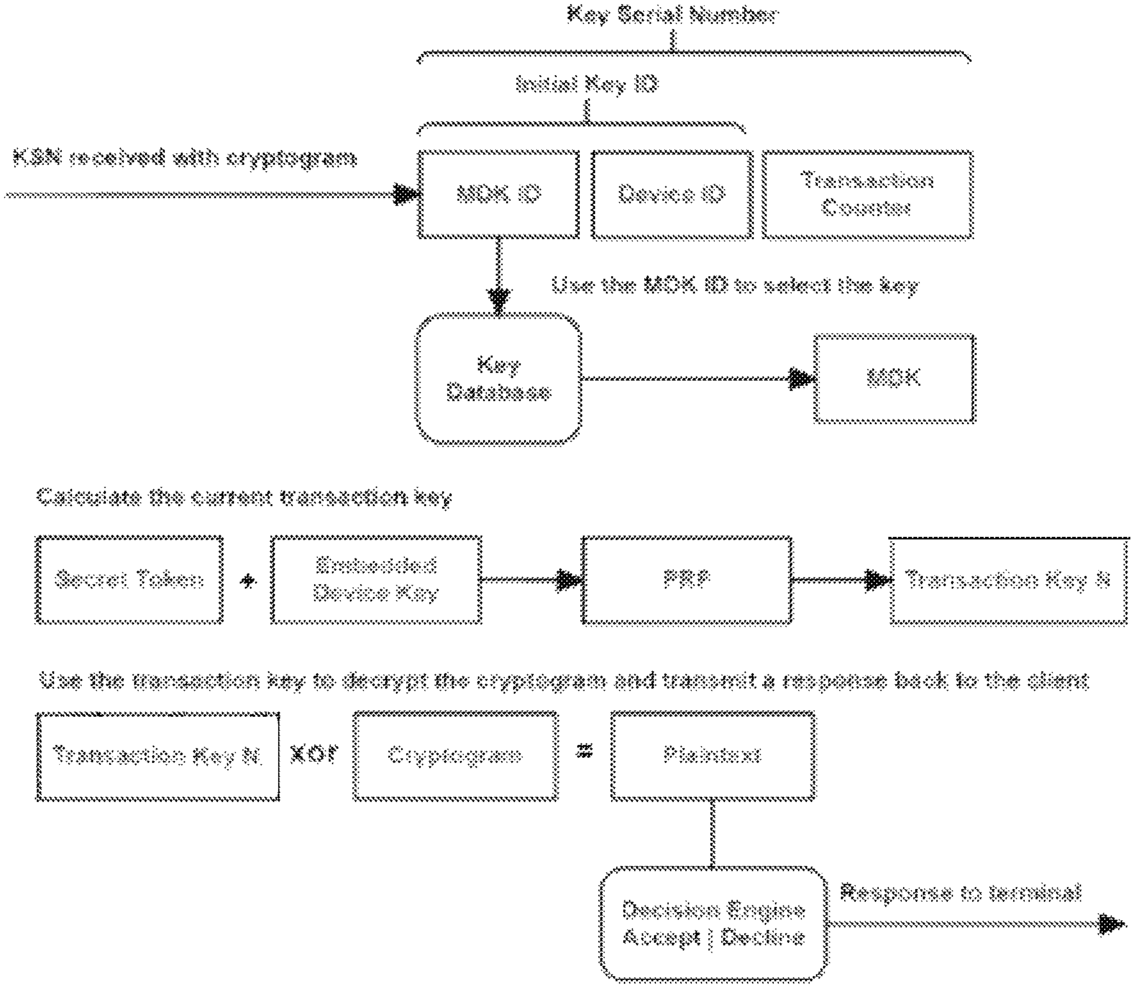
FIG. 17 shows a server transaction key generation example according to an embodiment of the present invention.

FIG. 17 shows a server transaction key generation 1700. The server receives the KSN from the client, and uses the KID to select the correct master key from the key database. The client's EDK is derived by permuting the concatenated DID and BDK. The client's token is derived by permuting the concatenated CTOK and STK. The server concatenates the EDK and the secret token to key the PRF, which generates the client's transaction key cache. In an embodiment, the server only generates keys up to the permutation block containing the requested transaction key, performing the minimum number of permutations calls necessary to extract the target key. The server then XORs the transaction key with the cipher-text, decrypting the clients PIN, and passing the message to the server's PIN verification and transaction decision engine.

Figure 18:
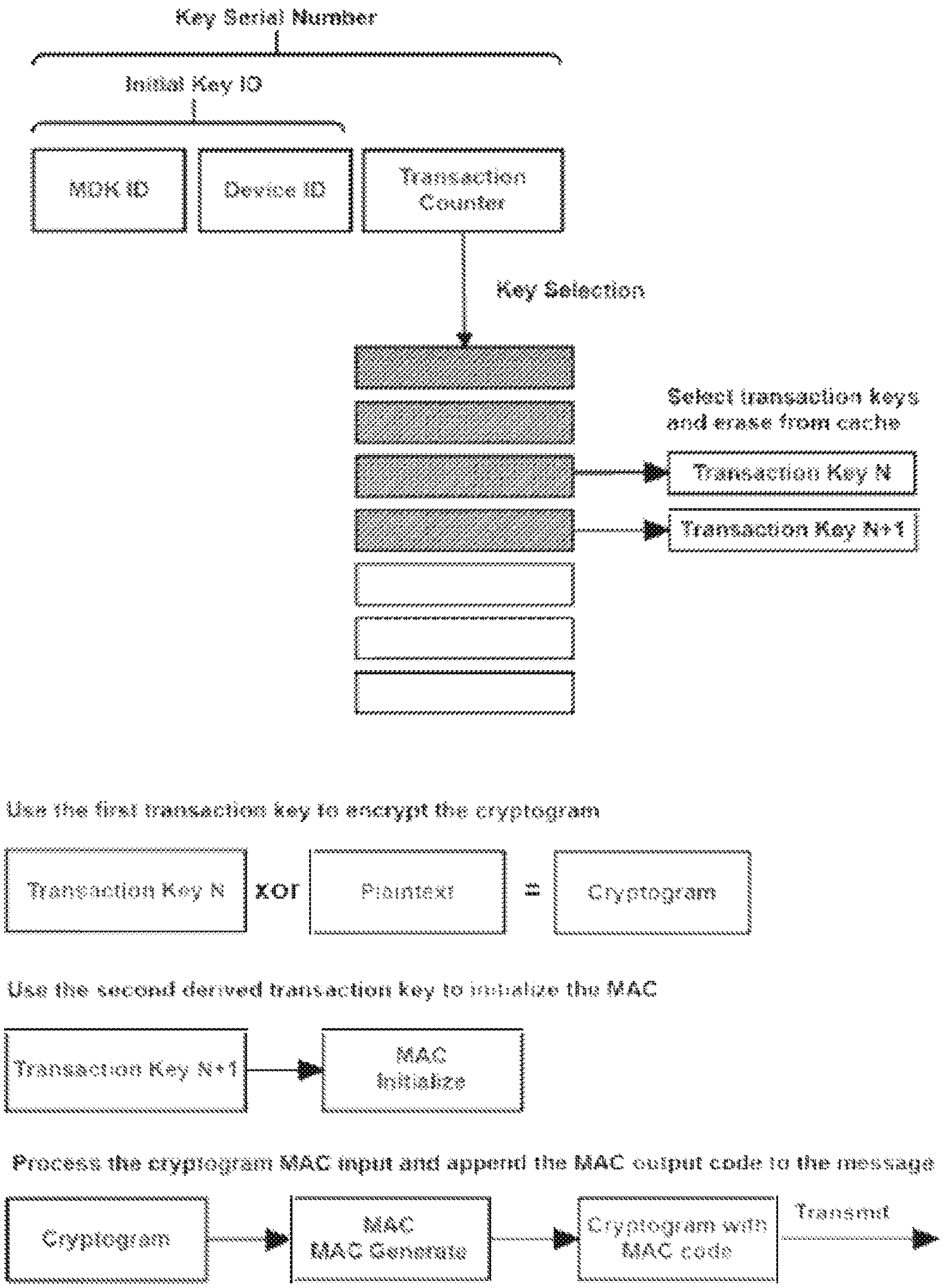
FIG. 18 shows a client encryption and authentication example according to an embodiment of the present invention.

FIG. 18 shows a client encryption and authentication system 1800. The client uses two transaction keys taken from the key cache to encrypt and the authenticate a message. The first key is XOR'd with the message to produce the cipher-text. The second key is used to key KMAC, which takes the cipher-text as an input and produces a MAC code. The MAC code is then appended to the cipher-text and sent to the server.

Figure 19:
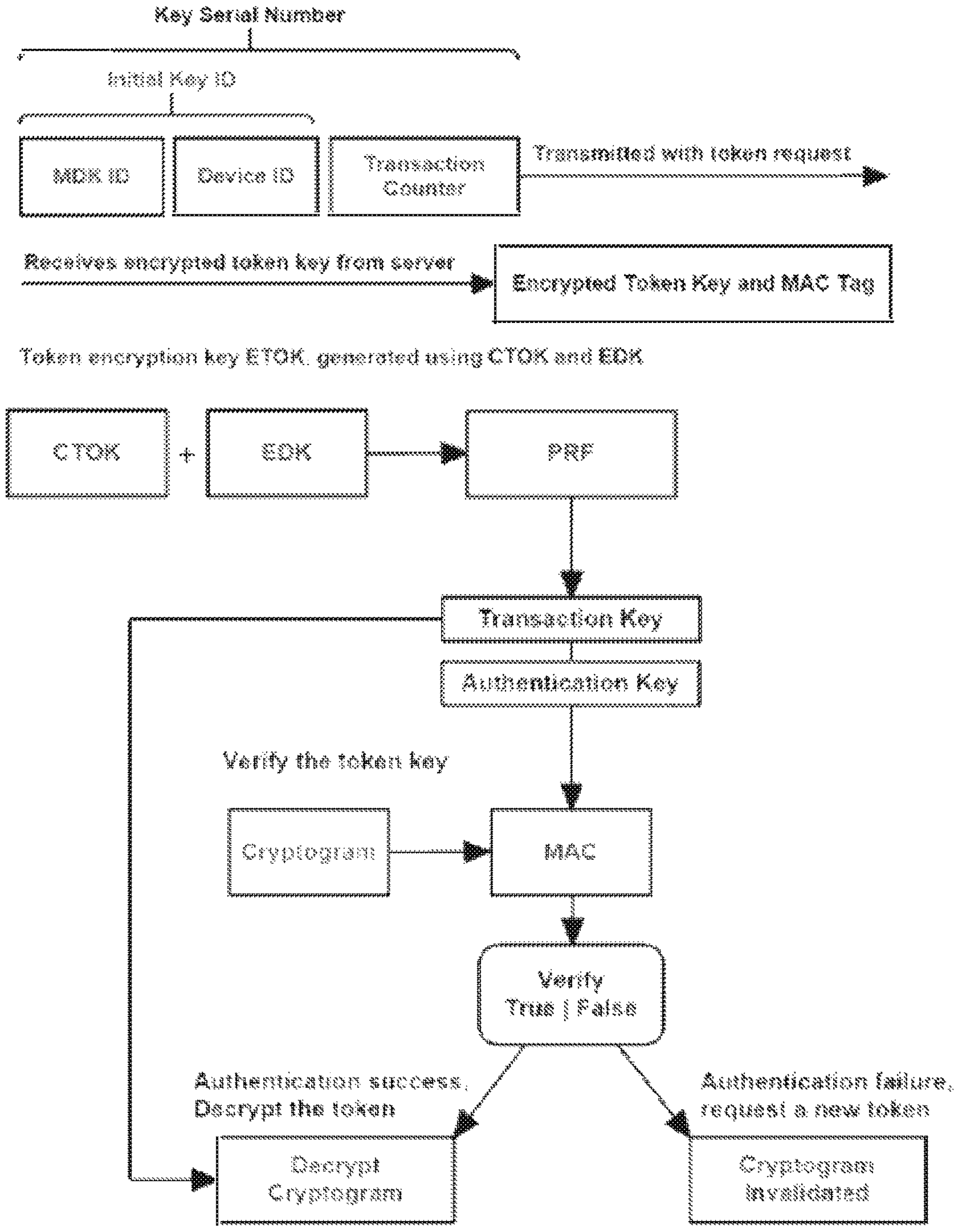
FIG. 19 shows a server verification and message decryption example according to an embodiment of the present invention.

FIG. 19 shows a server verification and message decryption system 1900. The server receives the authenticated cryptogram, and the client's KSN. It uses the KID to select the master key associated with the client terminal. The server then derives the client's embedded device key, and the client's token key, uses them to key the PRF and reconstruct the client's key cache.

The server extracts two keys from the cache, the first key is later used to decrypt the cipher-text, the second key is used to key KMAC and verify the cipher-text. Only if the new code generated by KMAC for the cipher-text, matches the MAC code appended to the cipher-text, is the key decrypted.

If the decryption succeeds, the cipher-text PIN is decrypted and the message is passed to the transaction servers decision engine, and the client is then notified of the transaction outcome (accept or decline). If the authentication fails, the server sends a message to the client, requesting a new cryptogram. The client shall then generate a new authenticated cryptogram. The server shall log this event, and treat repeated failures as a potential compromise of the client device and/or its communications channel.

the following legend may be followed.

bdk—The Base Derivation Key array
C—Client
did—The clients Device Identity string
edk—The embedded device key array
etok—Encrypted token
fn—The implementations formal name
kid—The master Key Identity string
ks—A pseudo-random array generated by the PRF
ksn—Key serial number
mdk—The Master Derivation Key structure
P—Permutation function: SHAKE
PRY—Pseudo random bytes generator: SHAKE
S—Server
stk—The Secret Token Key array
tk—The transaction key used to encrypt or decrypt a message
tkc—The Transaction Key Cache, a set of key stream arrays used to encrypt messages
tok—The temporary token key
tsm—The token MAC string
TR—Token request
trc—Token request counter
x—A plain-text message
y—A cipher-text message
||—Concatenate two arrays or strings
□—A bitwise XOR The master key structure (MKD); base derivation key (BDK), and secret token key (STK), SHOULD be generated using a true random number generator (TRNG).

In the CEX library version, the RNG used is ACP, which uses the system RNG along with various timers and system unique values, CPU and memory jitter, is used to key an instance of cSHAKE-512 which produces the pseudo-random output. If a true random number generator is not available, it is recommended that these keys are derived with a high-quality random generator such as ACP. The key identity (KID) is intended as a database identity reference, it should be a monotonic counter, unique for each master key set.

The client initializes the exchange by sending a token request packet to the server, which includes its key serial number (KSN). The server looks up the master key identity (KID), the first 4 bytes of the KSN, and matches it to the instance of the master derivation key (MDK) associated with that device. The server then combines the implementation name, the client's device identity (DID), and the token-request counter to form the custom token string (CTOK). The token-request counter is calculated from the KSNs transaction counter, the last 4 bytes of the KSN, divided by the size of the transaction key cache. The CTOK is concatenated with the secret token key (STK) and permuted, creating the new device token.

The server derives the clients embedded device key (EDK) by concatenating the DID with the base derivation key (BDK) and permuting the array, outputting the EDK. The CTOK is concatenated with the EDK and permuted to create the token encryption key.

The token is XOR'd with the token encryption key, a MAC code is generated and appended to the key, and it is sent back to the client.

The client then executes these steps in reverse; generating the MAC key using the EDK and TMS, authenticating the cipher-text, then creating the token customization string, and concatenating that with its EDK and permuting the array, to create the token encryption key.

Once authenticated, the client decrypts the token using an XOR of the token encryption key and the encrypted token (ETOK). The token is then concatenated with the EDK, and used to key the PRF, which generates the client's key cache.

On the client request side, the exchange begins with the client sending the server a token request packet along with the clients KSN.

On the server response side, the server creates the custom token string (CTOK), using the token request counter, concatenated with the algorithm's formal name, and the device id string ctok=(trc||fn||did)

The server then generates the unique secret token, by concatenating the CTOK string and the secret token key (STK), and permuting them to create a unique token key. tok=P(ctok||stk).

The server derives the devices embedded device key (EDK), by concatenating the devices identity string (DID), and the master key's base derivation key (BDK), and then permuting them to derive the EDK. edk=P(did||bdk)

The server creates a key stream; a pseudo random array of bytes, by permuting the CTOK concatenated with the devices embedded device key (EDK). ks=P(ctok||edk)

The server encrypts the new token using a bitwise XOR of the key-stream and the secret token key. etok=tok□ks The MAC function state is initialized with the TMS, a concatenation of the client's KSN and the MAC functions formal name string. tms=ksn||mname The server then generates the MAC code used to authenticate the cipher-text, by initializing the MAC function state with the TMS. The EDK is used to key the function, which processes the encrypted token message, and outputs a MAC code, which is appended to the encrypted token key. etok=etok||M(tms, edk, etok)

The server then transmits the authenticated and encrypted token key to the client. S□C{y}Tk On the client response side, after receiving the encrypted and authenticated token, the client recreates the TMS. tms=ksn||fname The client then keys the MAC function using the TMS and EDK and generates a MAC code for the encrypted token key (ETOK) m=M(tms, edk, etok)

The newly generated MAC code is compared to the MAC code appended to the ETOK cryptogram, if equivalent, the token is decrypted. If authentication fails the function returns a failure state, which is propagated up the application stack for handling. F=m1≡m2 ? true:false If the token is authenticated successfully, the client recreates the token customization string (CTOK) using the token request counter, the algorithm's formal name, and the device's identity string. ctok=(trc||fn||did)

The pseudo random key-stream is then generated by permuting the custom token concatenated with the embedded device key (EDK). ks=P(ctok||edk)

The token is decrypted by XORing the encrypted token and the key-stream, producing the decrypted token. tok=etok 0 ks The client then concatenates the secret token key and the embedded key, to key the PRF, and generates the transaction key cache (TKC). tkc=PRF(tok|edk)□{$k^1$, $k^2$ . . . kn}

The transaction key cache is generated each time the key cache is exhausted. The sequence starts when the client requests a secret token key from the server. C□S{x}TRksn The server responds by sending the encrypted token back to the client. S□C{y}Tk The client generates the key-stream used to decrypt the token by concatenating the custom token string (CTOK) and the embedded device key (EDK) and permuting them: ks=P(ctok||edk)

The keystream is then used to decrypt the token: x=–Ek (y)=(tok=(etok 0 ks))

The token is concatenated with the embedded device key (EDK) and used to key the PRF, the token key is then erased to promote predictive resistance. tok=0

The keyed PRF is then used to generate the set of transaction cache keys: tkc=PRF(tok|edk)□{$k^1$, $k^2$ . . . kn}

On the message encryption side: the client selects the next available transaction key (TK) from the transaction key cache (TKC), and increments the key transaction counter (KTC). tk=(Kktc), ktc=ktc+1

The message is encrypted using the transaction key. y=Ek(x)=(x 0 tk)

The transaction key is erased from the key cache to preserve forward security. tkc=(Kktc=0)

The encrypted message along with the client's key serial number (KSN) are then sent to the server: C□S{y}ksn On the message decryption side: The server receives the encrypted message and the KSN from the client, and concatenates the client's device identity string (DID) and the base derivation key (BDK) and permutes them, to derive the clients embedded device key (EDK). edk=P(did||bdk)

The server then uses the transaction counter in the KSN to calculate the token request counter, concatenates this with the algorithms formal name and the client's device identity to create the custom token string: ctok=(trc||fn||did)

The custom token string (CTOK) is concatenated with the secret token key (STK) and permuted, to create the token key (TOK). tok=P(ctok||stk)

The token key is concatenated with the EDK to key the PRF, which generates the transaction key cache: tkc=PRF (tok||edk)□{$k^1$, $k^2$ . . . kn}

The PRF only generates the number of keys up to the block containing the target transaction key. Once the correct transaction key is generated, it is used to decrypt the message: x≡–Ek(y)=(x=(y 0 tk))

The client constants must remain static, unchanged in the implementation in order to match constants in the server implementation. The one constant that can be defined in the implementation, but must be set identically in both server and client, is the key cache multiplier, the constant that determines the number of key registers in the client's internal key cache. All constant values are defined as unsigned integers. The constant names and format correspond to the C reference implementation, linked in the References section. FIG. 20 shows example HKDS client constants 2000.

The client state includes the state members used by the HKDS terminal client for its internal operations. This includes unchangeable values stored within a secure tamperproof module, the embedded device key (EDK) and the portion of the client device identity string (DID) that represents the unique client identity string (the last 32-bits of the DID). Working variables required as persistent state by the client's functions, such as the key transaction counter, key cache, cache state flag, and the master key identity shall be stored in non-volatile memory. The master key identity (KID) portion of the KSN shall be programmable, should the master key ever need to be changed. Whereas the device identity (DID), shall be considered a permanent assignment, and protected along with the embedded key (EDK) in a tamperproof module.

The example software implementation of the client state is represented here as a struct, a composite structure containing the arrays and variables used by the client's function calls, this has been done for the sake of providing clarity in the example implementation. However, the programming of a terminal client device shall separate the components into shared non-volatile memory, and the secure memory module, as described.

FIG. 21 shows an example HKDS client state 2100. The hkds_client_state contains the HKDS client state.

The client begins initialization by transferring the EDK to the security module, and loading the client's device identity string (DID) into the KSN. This function represents a simplified transfer of the EDK, which will have to be loaded per the requirements of the hardware security module used by the client device. Other state like the state variables and the transaction key cache, should be stored in non-volatile memory on the device.

Once the devices internal state has been initialized with the EDK and device identity, and the device is connected to the network, it must make a token key request to the server, before the transaction key cache can be constructed, and the device can begin managing user transaction requests.

All transactions between the client and server should use a reliable network transport mechanism such as TCP, the transport control protocol. The network transport must handle the underlying transport of packets at a layer beneath the HKDS protocol operation, and manage the reliable exchange of packet data between the client terminal and transaction server.

Once the encrypted token key has been received by the client, the client authenticates the token. If the MAC code appended to the encrypted token, matches the one generated by the client for the cipher-text received from the server, the client decrypts the token. If the codes do not match, the function returns false and the token is set to zero, to be processed by the application stack with either a new token request, or by placing the device in an error state pending reset.

The client uses the custom token array (CTOK) concatenated with the embedded device key (EDK), to key the PRF and generate the key-stream. The client then uses this key-stream to decrypt the secret token key.

For client key cache generation, the token key is concatenated with the EDK to key the PRF, which in turn, generates the client's transaction key cache. When the client is initialized, the encrypted secret token key dispatched by the server, is and is decrypted using the custom token (CTOK) and embedded device key (EDK), permuted to create a key-stream that is XOR'd with the encrypted token (ETOK). After the token decryption, a new key cache is generated using the secret token key, concatenated with the client's EDK to initialize the pseudo random function (SHAKE), used to generate the transaction key cache.

Each time a key cache is generated, the secret token key shall be erased from the client's memory. Erasure of the token key ensures that previously used keys in the cache that have been erased, cannot be reconstructed (forward security). The secret token key is concatenated with the EDK, to key the PRF which then generates the transaction key cache, the token is then erased from the client's memory. In this way, even if the client's internal state is captured, the adversary cannot predict future keys, unless the adversary possesses both the protected EDK, and owns the communication channel and can capture future token exchanges, this provides a high degree of predictive resistance to all future transaction keys, excepting in the complete compromise of both the terminal, and the communications channel.

Client encryption of a PIN message consists of loading the next available transaction key from the transaction key cache, incrementing the transaction counter, and XORing the transaction key with the plain-text message to produce the cipher-text, and then erasing that key from the cache. Because of the simplicity of this step, client encryption is very fast and efficient. Although HKDS is designed primarily as a means to encrypt small messages, such as PIN numbers used by point-of-sale devices, it can also be used to key a cipher and mode, such as AES-GCM, for establishing an encrypted 2-way communications channel between terminals. The terminals would only need to extract the number of keys required to initialize the underlying cipher at the desired security. HKDS could easily be ported to this application, allowing a low cost, symmetric-based encryption scheme between remote terminals that have been preloaded with embedded keys. Because of the low-cost of the HKDS cryptosystem, both in the small implementation code size, and the low computational cost of the mechanism, it is ideally suited to IOT devices with limited memory and CPU configurations.

For client authenticated encryption, in an embodiment, HKDS uses KMAC, the Keccak based keyed-hash function for authentication. KMAC uses the same permutation function as SHAKE, re-using that function, to keep code size small, and KMAC, like SHAKE, uses 64-bit integers, making it very fast in hardware implementations. Benchmarks of KMAC versus HMAC(SHA-256), on a 64-bit compilation, show KMAC is significantly faster at authenticating both large and small messages.

For example, the client extracts two transaction keys from the key cache, the first key is used to encrypt the message. The second key then keys KMAC, which takes the encrypted message as input, and generates a MAC code in an encrypt-then-MAC configuration. The 16-byte MAC code is appended to the cipher-text, and used by the server to verify that the message has not been altered in transit.

For the client API, the decryption of an encrypted token key can be handled as follows.

Decrypt an encrypted token key sent by the server.bool hkds_client_decrypt_token(hkds_client_state*state, const uint8_t*etok, uint8_t*token)

For the client API, the encryption of a message to be sent to the server. bool hkds_client_encrypt_message (hkds_client_state*state, const uint8_t*plaintext, uint8_t*ciphertext)

For encryption of an authentication message: encrypt a message and add an authentication tag. The PIN is first encrypted, then the cipher-text is used to update a keyed KMAC function. An optional data can be added to the MAC update, such as the IP address of the client. The authentication tag is appended to the encrypted PIN and returned by the function. bool hkds_client_encrypt_message (hkds_client_state*state, const uint8_t*plaintext, uint8_t*ciphertext)

For generation of a cache, initialize the state with the secret key and nonce. void hkds_client_generate_cache (hkds_client_state*state, const uint8_t*token)

Initialize the state with the embedded device key and device identity. void hkds_client_initialize_state (hkds_client_state*state, const uint8_t*edk, const uint8_t*did)

The master derivation key (MDK) is comprised of three arrays; the base derivation key (BDK), used to derive the clients embedded device key (EDK). The secret token key (STK), which is used to derive unique secret token keys sent to the client, and the key identity (KID), a unique 4-byte identity string, which is used by the server to select the master key associated with the client device. The size of the BDK and the STK keys are dependent upon the implementation security used by HKDS; 128-bit security uses 16-byte BDK and STK random keys, 256-bit security uses 32-byte keys, and 512-bit security use 64-byte keys.

In an embodiment, these key sizes can be reduced by half, in that the keys generated by the client and subsequently derived by the server, are generated with a combination of both the BDK and STK derivation keys. However, HKDS uses a two-tier security paradigm, one that uses the secondary token key to inject entropy into the system, and that the integrity of this system against future attacks will depend on both keys being equal to the desired security level, thereby, an implementation of HKDS shall employ the key sizes as described.

HKDS is a fast, efficient, and highly optimized key distribution system, reducing key sizes to save a very small amount of cost, is not considered a valid optimization technique, and could undermine the security of the mechanism. Any implementations that aim to reduce key sizes, will be rejected as non-compliant to this specification, and shall be regarded as potentially insecure.

FIG. 22 shows MDK state members 2200. The hkds_server_state contains the HKDS server state. FIG. 23 shows HKDS server state members 2300.

In embodiments, the server constants must remain static, unchanged in the implementation in order to match constants in the client implementation. The one constant that can be defined in the implementation, but must be set identically in both server and client, is the key cache multiplier, the constant that determines the number of key registers in the client's internal key cache. All constant values are defined as unsigned integers.

The constant names and name format correspond to the C reference implementation, linked in the References section. FIG. 24 shows example HKDS server constants 2400.

For server initialization, the server receives the plain-text KSN along with an encrypted message from the client. The server uses the KID, the master key identity, which is the first 4 bytes of the KSN, to identify the master key associated with the client. The server then loads the master key, and loads the client's device identity and transaction count.

The server generates a unique secret token-key for each client, and for every token exchange. The token key is derived by concatenating the secret token key (STK), with the implementation name, the client's device identity, and the token requests counter (CTOK), and uses this to key the pseudo random function (SHAKE). The PRF then derives a new token key, keeping the primary STK secret from the client, and the secret token unique for each client device and token request.

The server initializes the MAC function state to the token MAC string (TMS), keys the function with the client's EDK, and processes the encrypted token key as the message, appending a 16-byte MAC code to the encrypted token key (ETOK).

The server encrypts the token by recreating the client's embedded device key (EDK), concatenating the custom token string (CTOK) with the EDK and permuting them to create the token encryption key. The server encrypts the token key by a bitwise XOR of the token, and the token encryption key.

The server generates the transaction key through a series of steps. The first step is to derive the client's embedded device key, by concatenating the client's device identity (DID), with the base derivation key (BDK) to key the PRF. The client's embedded device key (EDK), is the output of the PRF.

The server then generates the second key, the client's secret token key, and concatenates the two keys to initialize the PRF. The server generates the client's key cache, up to the block containing the transaction key specified in the transaction counter portion of the KSN, and selects the correct key from the block.

The server decrypts a client message by deriving the transaction key as described above, and then performing a bitwise XOR of the message cipher-text and the transaction key to create the message plain-text.

For server message verification and decryption, the server performs decryption by deriving two of the client's transaction keys; the first key is used to decrypt the cipher-text, the second to key the MAC function. HKDS uses an encrypt-then-MAC authentication scheme, whereby the message is first encrypted, and then the message cipher-text is used as the message input for the MAC function.

The second key is used to initialize KMAC, and then the cipher-text sent by the client is hashed to calculate the MAC code. The newly generated MAC code is compared to the MAC code appended to the cipher-text by the client's authentication process. If the MAC codes match, the function uses the first key to decrypt the cipher-text to the plaintext array, and the function returns true. If the codes do not match, the function skips decryption, and returns false, and a zeroed plaintext array.

For the server API, to decrypt a message sent by the client, use, e.g., void hkds_server_decrypt_message (hkds_server_state*state, const uint8_t*ciphertext, uint8_t*plaintext)

To decrypt a cipher message, verify a ciphertext's integrity with a keyed MAC, if verified return the decrypted PIN message. This function uses KMAC to verify the cipher-text integrity before decrypting the message. An optional data can be added to the MAC update, such as the originating clients IP address. If the MAC verifies the cipher-text, the message is decrypted and returned by this function. If the MAC authentication check fails, the function returns false and the plaintext is zeroed. void hkds_server_decrypt_message(hkds_server_state*state, const uint8_t*ciphertext, uint8_t*plaintext)

To encrypt a secret token key to send to the client, use, e.g., void hkds_server_encrypt_token (hkds_server_state*state, uint8_t*etok)

To generate EDK. the embedded device key of a client, use, e.g., void hkds_server_generate_edk(const uint8_t*bdk, const uint8_t*did, uint8_t*edk)

To generate MDK, a master key set, use, e.g., void hkds_server_generate_mdk(void (*rng_generate)(uint8_t*, size_t), hkds_master_key*mdk, const uint8_t*kid)

To initialize the state with the embedded device key and device identity, use, e.g., void hkds_server_initialize_state (hkds_server_state*state, hkds_master_key*mdk, const uint8_t*ksn)

To, initialize the state with the embedded device key and device identity, use, e.g., void hkds_server_initialize_state (hkds_server_state*state, hkds_master_key*mdk, const uint8_t*ksn)

Fora parallel server API, see FIG. 25 which shows an example HKDS parallel state structure. E.g., the hkds_server_x8_state, includes the parallel x8 server state.

To decrypt a 2-dimensional x8 set of client messages. void hkds_server_decrypt_message_x8 (hkds_server_x8_state*state, const uint8_t ciphertext [HKDS_CACHX8_DEPTH][HKDS_MESSAGE_SIZE], uint8_t plaintext[HKDS_CACHX8_DEPTH] [HKDS_MESSAGE_SIZE])

To verify a 2-dimensional x8 set of ciphertext's integrity with a keyed MAC, if verified return the decrypted PIN message. This function uses KMAC to verify the cipher-text integrity before decrypting the message. An optional data can be added to the MAC update, such as the originating clients IP address. If the MAC verifies the cipher-text, the message is decrypted and returned by this function. If the MAC authentication check fails, the function returns false and the plaintext is zeroed.

void hkds_server_decrypt_verify_message_x8 (hkds_server_x8_state*state, const uint8_t ciphertext [HKDS_CACHX8_DEPTH][HKDS_MESSAGE_SIZE+HKDS_TAG_SIZE], const uint8_t data [HKDS_CACHX8_DEPTH] [HKDS_MESSAGE_SIZE], size_t datalen, uint8_t plaintext[HKDS_CACHX8_DEPTH][HKDS_MESSAGE_SIZE], bool valid[HKDS_CACHX8_DEPTH])

To encrypt a 2-dimensional x8 set of secret token keys:

void hkds_server_encrypt_token_x8 (hkds_server_x8_state*state, uint8_t etok [HKDS_CACHX8_DEPTH][HKDS_STK_SIZE+ HKDS_TAG_SIZE])

To generate a 2-dimensional x8 set of client embedded device keys:

void hkds_server_generate_edk_x8 (hkds_server_x8_state*state, const uint8_t did [HKDS_CACHX8_DEPTH][HKDS_DID_SIZE], uint8_t edk[HKDS_CACHX8_DEPTH][HKDS_EDK_SIZE])

To initialize a 2-dimensional x8 set of server states with the embedded device keys and device identities:

void hkds_server_initialize_state_x8 (hkds_server_x8_state*state, hkds_master_key*mdk, const uint8_t ksn[HKDS_CACHX8_DEPTH][HKDS_KSN_SIZE To decrypt a 3-dimensional 8x8 set of client messages.

void hkds_server_decrypt_message_x64 (hkds_server_x8_state state[HKDS_PARALLEL_DEPTH], const uint8_t ciphertext[HKDS_PARALLEL_DEPTH][HKDS_CACHX8_DEPTH] [HKDS_MESSAGE_SIZE], uint8_t plaintext [HKDS_PARALLEL_DEPTH] [HKDS_CACHX8_DEPTH] [HKDS_MESSAGE_SIZE])

To verify a 3-dimensional 8×8 set of ciphertext's integrity with a keyed MAC, if verified return the decrypted PIN message. This function uses KMAC to verify the cipher-text integrity before decrypting the message. An optional data can be added to the MAC update, such as the originating clients IP address. If the MAC verifies the cipher-text, the message is decrypted and returned by this function. If the MAC authentication check fails, the function returns false and the plaintext is zeroed. See:

void hkds_server_decrypt_verify_message_x64 (hkds_server_x8_state state[HKDS_PARALLEL_DEPTH], const uint8_t ciphertext[HKDS_PARALLEL_DEPTH][HKDS_CACHX8_DEPTH] [HKDS_TAG_SIZE+HKDS_MESSAGE_SIZE], const uint8_t data[HKDS_PARALLEL_DEPTH] [HKDS_CACHX8_DEPTH][HKDS_MESSAGE_SIZE], size_t datalen, uint8_t plaintext[HKDS_PARALLEL_DEPTH][HKDS_CACHX8_DEPTH] [HKDS_MESSAGE_SIZE], bool valid [HKDS_PARALLEL_DEPTH] [HKDS_CACHX8_DEPTH])

To encrypt a 3-dimensional 8x8 set of secret token keys:

void hkds_server_encrypt_token_x64 (hkds_server_x8_state state[HKDS_PARALLEL_DEPTH], uint8_t etok[HKDS_PARALLEL_DEPTH][HKDS_CACHX8_DEPTH] [HKDS_STK_SIZE+HKDS TAG SIZE])

To generate a 3-dimensional 8x8 set of client embedded device keys:

void hkds_server_generate_edk_x64 (hkds_server_x8_state state[HKDS_PARALLEL_DEPTH], const uint8_t did[HKDS_PARALLEL_DEPTH][HKDS_CACHX8_DEPTH] [HKDS_DID_SIZE], uint8_t edk [HKDS_PARALLEL_DEPTH] [HKDS_CACHX8_DEPTH][HKDS_EDK_SIZE])

To initialize a 3-dimensional 8x8 set of server states with the embedded device keys and device identities.

void hkds_server_initialize_state_x64 (hkds_server_x8_state state[HKDS_PARALLEL_DEPTH], hkds_master_key mdk[HKDS_PARALLEL_DEPTH], const uint8_t ksn [HKDS_PARALLEL_DEPTH] [HKDS_CACHX8_DEPTH][HKDS_KSN_SIZE])

For HKDS Factory API, to serialize a packet header to a byte array:

void hkds_factory_serialize_packet_headequint8_t*output, const hkds_packet_header*header)

To serialize a client message request to a byte array:

void hkds_factory_serialize_client_message (uint8_t*output, const hkds_client_message_request*header)

To serialize a client token request to a byte array:

void hkds_factory_serialize_client_token(uint8_t*output, const hkds_client_token_request*header)

To serialize a server message response to a byte array:

void hkds_factory_serialize_server_message (uint8_t*output, const hkds_server_message_response*header)

To serialize a server token response to a byte array:

void hkds_factory_serialize_server_token (uint8_t*output, const hkds_server_token_response*header)

To serialize an administrative message to a byte array:

void hkds_factory_serialize_administrative_message (uint8_t*output, const hkds_administrative_message*header)

To serialize an error message to a byte array:

void hkds_factory_serialize_error_message (uint8_t*output, const hkds_error_message*header)

To extract a packet header structure from a byte array.

hkds_packet_header hkds_factory_extract_packet_header(const uint8_t*input)

To extract a client message request from a byte array:

hkds_client_message_request hkds_factory_extract_client_message(const uint8_t*input)

To extract a client token request from a byte array:

hkds_client_token_request hkds_factory_extract_client_token(const uint8_t*input)

To extract a server message response from a byte array:

hkds_server_message_response hkds_factory_extract_server_message(const uint8_t*input)

To extract a server token response from a byte array:

hkds_server_token_response hkds_factory_extract_server_token(const uint8_t*input)

To extract a server token response from a byte array:

hkds_server_token_response hkds_factory_extract_server_token(const uint8_t*input)

To extract an administrative message from a byte array.

hkds_administrative_message hkds_factory_extract_administrative_message(const uint8_t*input)

To extract an error message from a byte array:
hkds_error_message hkds_factory_extract_error_message(const uint8_t*input)

To build a client message request from components:
hkds_client_message_request hkds_factory_create_client_message_request(const uint8_t*message, const uint8_t*ksn, const uint8_t*tag)

To build a client token request from components:
hkds_client_token_request hkds_factory_create_client_token_request(const uint8_t*ksn)

To build a server message response from components:
hkds_server_message_response hkds_factory_create_server_message_response(const uint8_t*message)

To build a server token response from components:
hkds_server_token_response hkds_factory_create_server_token_reponse(const uint8_t*etok)

To build an administrative message from components:
hkds_administrative_message hkds_factory_create_administrative_message(const uint8_t*message)

To build an error message from components:
hkds_error_message hkds_factory_create_error_message (const uint8_t*message, hkds_error_type err)

To extract the packet type enumeral from a serialized packet header:
hkds_packet_type hkds_factory_extract_packet_type (const uint8_t*input)

To extract the protocol id numeral from a serialized packet header:
hkds_protocol_id hkds_factory_extract_protocol_id (const uint8_t*input)

To extract the packet size from a serialized packet header:
size_t hkds_factory_extract_packet_size(const uint8_t*input)

To extract the packet sequence from a serialized packet header:
uint8_t hkds_factory_extract_packet_sequence(const uint8_t*input)

On the HKDS Queue API, FIG. 26 shows an example HKDS queue state.

hkds_queue_message_queue includes the HKDS queue state.

To destroy, reset the queue context state:
void hkds_queue_destroy (hkds_queue_message_queue*ctx)

To flush the contents of the queue to a byte array:
void hkds_queue_flush (hkds_queue_message_queue*ctx, uint8_t*output)

To initialize the queues state context:
void hkds_queue_initialize (hkds_queue_message_queue*ctx, size_t depth, size_t width, uint8_t*tag)

To remove an item from the queue and copies it to the output array.
void hkds_queue_pop(hkds_queue_message_queue*ctx, uint8_t*output, size_t outlen)

To add an item from the queue:
void hkds_queue_push(hkds_queue_message_queue*ctx, const uint8_t*output, size_t outlen)

IsFull—returns true if the queue is full:
bool hkds_queue_isfull (hkds_queue_message_queue*ctx)

IsEmpty—returns true if the queue is empty:
bool hkds_queue_isempty (hkds_queue_message_queue*ctx)

Count—returns the number of items in the queue:
size_t hkds_queue_count (hkds_queue_message_queue*ctx)

Extract Block X8—export a block of 8 messages to a 2-dimensional message queue:
size_t hkds_queue_extract_block_x8 (hkds_queue_message_queue*ctx, uint8_t output [HKDS_CACHX8_DEPTH][HKDS_MESSAGE_SIZE])

To extract Block X64—export 8 slots of 8 blocks of messages (8×8) to a 3-dimensional message queue:
size_t hkds_queue_extract_block_x64 (hkds_queue_message_queue*ctx, uint8_t output [HKDS_PARALLEL_DEPTH] [HKDS_CACHX8_DEPTH][HKDS_MESSAGE_SIZE])

To extract Block X64—serialize a set of messages to an array:
size_t hkds_queue_extract_stream (hkds_queue_message_queue*ctx, uint8_t*stream, size_t items)

To evaluate performance of DUKPT-AES versus HKDS, the performance of HKDS with the algorithm it is meant to replace are compared. To make this comparison, a C implementation of DUKPT, based on the ANSI revision; X9.24-3-2017, the AES based DUKPT implementation is used. The DUKPT implementation is based on the code presented in that document, but has been optimized for best possible performance while strictly adhering to that specification. Two versions of the DUKPT code are used for comparison, the first uses a standard software-based AES C implementation, the core permutation function in DUKPT. The second implementation uses an optimized version of AES that utilizes embedded CPU instructions (AES-NI), which offers a significant speedup to the DUKPT performance benchmarks.

Both implementations are tested because the Keccak implementation used, is not optimized, it is a software implementation of SHAKE, with a standard Keccak permutation function. That Keccak permutation function can however, also be placed on a CPU's instruction set, as was done with AES. The HKDS implementation can also be optimized in a similar way, and that those optimizations could offer a near doubling of performance.

Each relevant operation is measured—encryption and decryption of a cryptogram—as well as authenticated encryption and verified decryption of a cryptogram. HKDS uses KMAC for authentication, the Keccak based MAC function, and for DUKPT, the recommended HMAC function with SHA2-256 is used.

The performance of DUKPT degrades on a server-side implementation as the transaction counter increments. The number of AES-128 re-keys and decryption calls increase to a maximum work factor of 16, meaning that as the transaction counter approaches the upper limit of keys that can be generated, the number of initializations and executions of the AES transform also increases, and performance, on the server managing decryption of client messages, steadily degrades. For example, with the transaction counter at 7, decryption requires 3 re-keys and transformation function executions, at 63 transactions, 6 executions, at 8191 transactions 13 AES re-keys and transform execution calls are required to recover the transaction key. This goes all that way up to a maximum work factor of 16 to generate the working key, plus one more to derive the initial intermediate key from the base derivation key, and a final derivation to produce the transaction key, for a total possible 18 AES re-keys and transformations required to recreate the transaction key. This number is doubled if using AES-256, for each AES key of 256 bits, requires two complete re-keys of AES and transformation calls for each cycle. This number is doubled again, if using authenticated encryption, as HMAC requires its own unique key.

In embodiments, HKDS performance is constant, regardless of the number of transactions. The key cache multiplier in HKDS determines the maximum number of permutations required to completely reconstruct the key cache. The default setting is 4, if the transaction key is within a permutation boundary, it will exit the permutation loop with only the number of permutation calls required to regenerate the transaction key. So, the variance is always a constant within that range, between 1 and the multiplier maximum, regardless how many previous keys have been generated. For this reason, only a complete benchmark to the maximum number of keys that can be derived by DUKPT could produce a true average of performance for this comparison, given that algorithms performance degradation, and this limited benchmark favors DUKPT by not including the complete metric.

HKDS also only requires one transaction key for encryption or decryption, whether it be for 128, 256, 512-bit or other, security profiles, and only requires one additional key for authentication.

Benchmark figures related to server-side processing, the most expensive operations which directly impact the costs incurred by financial transaction processing institutions, and those related to the client-side benchmarks are shown in the FIGS., allowing for a comparison of the impact on point-of-sale devices, which have limited processing power and memory resources.

For example, FIG. 27 shows HKDS vs DUKPT-AES performance benchmarks 2700, using a standard software-based form of AES with DUKPT. For example, FIG. 28 shows HKDS versus DUKPT-AESNI performance benchmarks 2800, using AES-NI and an optimized DUKPT.

These benchmarks are the average time in nanoseconds, using an average across iteration counts based on multiples of the HKDS key-cache size. For 128-bit implementations, 42 thousand iterations were sampled. For 256-bit benchmarks, 34 thousand iterations were measured. For authenticated encryption and decryption, the sample rate was halved to account for two keys being used in every iteration to 21 and 17 thousand respectively. The numbers are a one-off sample, using an Intel i7-9750H CPU, with 16 gigabytes of RAM.

The benchmark figures show that HKDS outperforms DUKPT by a huge margin, in every type of operation, in some cases, by more than a 100 to 1 ratio, even with the use of an optimized DUKPT-AES using embedded CPU instructions.

In embodiments, using CPUs with embedded Keccak instructions on servers processing transactions should further reduce HKDS processing times by a substantial margin. For example, such reduction in processing times can provide enormous cost reductions in the management of remote banking transactions handled by financial institutions.

In embodiments, the use of HKDS as a primary mode of secure encryption and authentication for point-of-sale transactions can allow for significant cost reduction by the institutions managing those transactions, by as much as 75 percent or more. In embodiments, HKDS provides long-term security, with low-cost 256-bit security, and up to 512-bit security capable implementations.

In embodiments, HKDS can be further enhanced by reducing the number of rounds used by the Keccak permutation function. This is enabled by using the Keccak half rounds flag, which reduces the permutation rounds from the standard twenty-four to twelve rounds. This nearly doubles the performance of the HKDS server functions as demonstrated in FIG. 29. Given that Keccak is one of the most thoroughly studied cryptographic functions of modern times, and that to date, only a handful of rounds can be broken, and that encrypting PIN numbers can be considered in the context of a low-to-medium security operation, this can be considered to be an acceptable performance enhancement, at least as it concerns pre-quantum computer implementations.

FIG. 29 shows example performance comparisons between full and half round Keccak performance benchmarks. The benchmarks measure the number of keys encrypted and decrypted, using 1 million keys, with the result in fractional seconds. These are the standard HKDS functions, significant speedups can be realized using the SIMD and parallel forms of these functions.

Embodiments of the present invention may be checked, as is done in cryptographic cases, conducting what is referred to as a known answer test. A known answer test uses publicly available set of parameters and values to allow a check of the validity of an embodiment by comparing the output(s) of the embodiment against "known correct answers" for the given set of parameters and values. If the outputs match, then is it possible that the embodiment may be correct. Even if the outputs match for one set of parameters and values, it is possible such implementation does not persist with another known test with different parameters and values—either due to a programming language error or other. If the outputs do not match, then it is possible that the embodiment may not be correct. For example, in an embodiment of the present invention, the known answer test—comparing the output of a client message encryption with a known answer—was conducted as follows. The same client message is used for each of the below known answer tests.

The client message: 000102030405060708090A0B0C0D0E0F

For: HKDS-128 bit encryption

The server MDK, which is used to generate the client's EDK:

BDK: 000102030405060708090A0B0C0D0E0F

STK: 000102030405060708090A0B0C0D0E0F

KID: 00010203

The client's DID: 010000000A09010001000000

Expected cipher-text: 21EDC540F713649F38EDB3CB9E26336E

For: HKDS-256 bit encryption

BDK: 000102030405060708090A0B0C0D0E0F101112131 415161718191A1B1C1 D1E 1F

STK: 000102030405060708090A0B0C0D0E0F101112131 415161718191A1B1C1D1E 1F

KID: 00010203

The client's DID: 010000000A0A010001000000

Expected cipher-text: 4422FD14DC32CF52765227782B7DF346

For HKDS-512 bit encryption

BDK: 000102030405060708090A0B0C0D0E0F1011121314 15161718191A1B1C1 D1E 1F20212223242526272 8292A2B2C2D2E2F303132333435363738393A3B3C 3D3E3F

STK: 000102030405060708090A0B0C0D0E0F1011121314

15161718191A1B1C1 D1E 1F20212223242526272 8292A2B2C2D2E2F303132333435363738393A3B3 C3D3E3F

KID: 00010203

The client's DID: 010000000A0B010001000000

Expected cipher-text: 8F8237E723C13AC5C07BDDE483F586DB

An embodiment of the present invention does not use the SHAKE function as the primary PRF (pseudorandom function) as in the above-described embodiments, and instead uses the cSHAKE XOF function as defined in NIST SP 800-185, incorporated herein by reference in its entirety. In this embodiment, the cSHAKE XOF was keyed by using CTOK as the customization parameter when generating the token encryption key, and the secret token as the customization parameter when generating the transaction key cache, rather than a concatenation of input arrays used as a single-key mechanism. This embodiment using cSHAKE instead of the standard SHAKE form, can provide better security properties. In embodiments using the standard SHAKE form, overall performance appears better. In embodiments, SHAKE has strong diffusion characteristics. In embodiments, the key and nonce sizes are constant. In embodiments using cSHAKE, there is an additional permutation call required to pre-initialize the state for this embodiment of HKDS.

An embodiment of the present invention uses KMAC (KECCAK message authentication code) as the primary PRF in the generation of the key cache. Like with cSHAKE, KMAC necessitates an additional permutation call to pre-initialize the state. This embodiment can provide better security given the additional permutation call.

In embodiments of the present invention, the selection of the primary PRF and permutation functions should be suitably cryptographically strong and robust, and need not only include the aforementioned examples of SHAKE, cSHAKE, and KMAC. For example, CTR DRBG (countermode deterministic random byte generator) can be used as the primary PRF, and HKDF(SHA2) (HMAC-key derivation function (secure hashing algorithm2)) (where HMAC is hash-based message authentication code) as a key derivation function.

In embodiments, the KECCAK-based primitives are useful functions for this protocol, given their high performance, strong diffusion characteristics, and range of security modes. In addition, they are the NIST SHA3 standard, and thus FIPS compliant. Accordingly, as described herein, alternatives to SHAKE and/or KECCAK-based primitives are possible and useful.

In embodiments, SHAKE is used in several different ways for various useful functions, including as (i) a key derivation function, (ii) a counter hash-based RBG, and (iii) for producing a keystream for an ad hoc stream cipher. These functions rely on SHAKE to act as a pseudo random function, and are simplified by reference as the generic term 'PRF' in this specification. For example, the pseudo-random token and embedded device key generation mechanisms use SHAKE as a key derivation function, using a key and counter to initialize SHAKE and generate a unique pseudo-random output used as keying material in subsequent operations. For example, the key-cache generation uses SHAKE as an RBG (random byte generator), generating a block of pseudo-random bytes, which are subsequently used as a key-stream; XOR'd with the message in a construction similar to the ChaCha stream cipher. See, e.g., "Cryptographic Sponge Functions," https://keccak.team/files/CSF-0.1.pdf, incorporated herein by reference in its entirety, for detailed cryptographic proofs of their security. Notably, SHAKE is FIPS-approved and part of the NIST SHA3 standard. For example, in the KECCAK paper at section 3.2, it is explained that:

"A sponge function can also be used as a stream cipher. One can input the key and some initial value and then get the key stream in the squeezing phase. Similarly, a simple pseudo random bit generator can be constructed by absorbing the seed data and then producing the desired number of bits. For having a mask generating function (also called key derivation function) one simply uses as input the seed and one truncates the output to the requested number of bits."

In embodiments, the uses of SHAKE and KMAC in the HKDS design have been extensively cryptoanalyzed. Since Keccak became the SHA3 standard, it is understood that no serious breaks in the design have been discovered, and SHAKE has since been integrated extensively into the cryptographic mainstream, evidenced by its widespread use and acceptance in the cryptographic community. In embodiments, SHAKE and KMAC using 512-bit security are provided above and can work in a similar way as SHA3-512, taking less data from the state with each permutation call (2n the expected security). These embodiment implementations provide a post-quantum pathway, such that if 512-bit keys are ever mandated or wanted, HKDS embodiments include such secure option and is ready for use.

In embodiments, HKDS uses Keccak for both key generation, encryption, and message authentication, creates a small software footprint, as both KMAC and SHAKE, use the same permutation function, creating a compact software for memory constrained devices.

In embodiments, the two-key system used by HKDS adds an additional small cost to the transaction process, and in return provides a far more secure system in several ways. For example, using the token injection system, introduces new entropy into the encryption process at regular intervals. And, unlike DUKPT, which uses a complex and expensive re-mixing process to derive transaction keys using the same base key for potentially hundreds of thousands of transactions, this injection of new entropy ensures that the keys for these transactions are derived from new keying material, which can be refreshed on the server at any time. DUKPT can have an upper limit on the number of derived keys (e.g., documented at 500,000), far less than is used in the lifetime of some busy terminals, which require complex and expensive re-keying of the terminal device. In embodiments, HKDS can change the token key at the server, requiring no modification of the terminal. Further, the complex methods used by DUKPT to derive keys is computationally expensive, and requires an increasing number of AES re-keys and transformations as the total number of transaction keys used increases. In embodiments, HKDS key generation is constant, it does not change, regardless the number of keys that are derived, and is determined to be much faster, i.e., process faster, than DUKPT. In embodiments, the token injection used by HKDS is periodic, and that interval can be defined by the implementor, and can be set to only one token exchange per 168 keys used by the terminal. It is found that even at this high-end of the exchange limit, embodiments of HKDS still outperform DUKPT-AES128 by a margin of more than 2 to 1, and a margin of 4 to 1 for DUKPT-AES256.

In embodiments, the use of token injection also enables predictive resistance. The token key is erased once the key-cache is created, meaning an adversary that captures the terminals state, will not be able to predict future keys, unlike DUKPT. The token system is also forward secure, in that each token sent to the terminal contains a new unique key, so that even if the state is captured, previous keys cannot be deduced. This is a much more secure system in several impactful ways; it is more flexible, more extensible, less costly, and provides a more secure distributed key infrastructure than DUKPT.

In embodiments, the performance of HKDS can be increased quite dramatically using embedded Keccak instructions. The current decryption ratios benchmarked with our C implementations place HKDS at a 4 to 1 performance ratio against DUKPT-AES128, and an 8 to 1 ratio against DUKPT-AES256. However, studies have been made that show that embedded Keccak instructions can offer more than 6-fold performance increase in the execution of Keccak based functions. In the paper "SIMD Instruction Set Extensions for Keccak," https://dl.acm.org/doi/10.1145/2948618.2948622, incorporated by reference hereto in its entirety, the paper states:

> "Our design is integrated on a 128-bit SIMD interface, applicable to the ARM NEON and Intel AVX (128 bit) architecture. The proposed instruction set is optimized for flexibility and supports multiple variants of the Keccak-f[b] permutation, for b equal to 200, 400, 800, or 1600 bit. We investigate the performance of the design using the GEM5 micro-architecture simulator. Compared to the latest hand-optimized results, we demonstrate a performance improvement of 2 times (over NEON programming) to 6 times (over Assembly programming). For example, an optimized NEON implementation of SHA3-512 computes a hash at 48.1 instructions per byte, while our design uses 21.9 instructions per byte. The NEON optimized version of the Lake Keyak AEAD uses 13.4 instructions per byte, while our design uses 7.7 instructions per byte. We provide comprehensive performance evaluation for multiple configurations of the Keccak-f[b] permutation in multiple applications (Hash, Encryption, AEAD). We also analyze the hardware cost of the proposed instructions in gate-equivalent of 90 nm standard cells, and show that the proposed instructions only require 4658 GE, a fraction of the cost of a full ARM Cortex-A9."

In embodiments, specialized Keccak instructions embedded on sever CPUs similar to the AES-NI instruction set, may yield tremendous increases in performance on an already exceptionally robust key distribution protocol. These performance increases could transform the server rooms of financial transaction processing entities worldwide, that would require only a small fraction of the hardware and support infrastructure they currently use, and providing a level of scalability and performance that is impossible using existing schemes and protocols. Embodiments of HKDS can transform the industry, providing a level of performance and security that can meet the challenges being faced in this century and beyond.

In quantum computing attacks, it is well understood that Grover's algorithm could reduce the security of most symmetric keyed primitives to d/2, or half the key-space. Both SHAKE and KMAC, like the many other algorithms affected by this attack, would require a doubling of the key size in order to remain secure once quantum computers become powerful enough to effectively break most symmetric cryptosystems. This is why 256-bit keys may soon become the minimum standard key size, and 128-bit ciphers, MACs, and hash functions will become obsolete. It is also possible that new cryptanalytic techniques, such as Boolean equation solving, or new and as of yet undiscovered attacks, may further reduce this security margin at some future time, thus, eventually making 256-bit keys obsolete. Accordingly, as described above and herein, embodiments of HKDS can provide at least up to 512-bit security, so that even if these attacks are one day realized, and quantum computers evolve to the scale and efficiency required to execute such attacks, embodiments of HKDS are able to meet the need, using a 512-bit key size.

For various embodiments of HKDS, the following references provide additional description and/or reference for some components of HKDS: NIST FIPS 202: SHA-3 Standard: Permutation-Based Hash and Extendable Output Functions; NIST SP 800-185: Derived Functions cSHAKE, KMAC, TupleHash and ParallelHash; NIST SP 800-90A: Recommendation for Random Number Generation; NIST SP 800-108: Recommendation for Key Derivation using Pseudorandom Functions; ANS X9.8-1: Personal Identification Number (PIN) Management and Security; ISO 16609: Banking Requirements for Message Authentication using Symmetric Techniques; ISO 8583: Bankcard Originated Messages Interchange Message Specifications; and ISO 9797-1: Information technology Security techniques Message Authentication Codes, each of which is incorporated herein in its entirety by reference thereto.

The reference, "The CEX++Cryptographic Library," https://github.com/Steppenwolfe65/CEX, is incorporated by reference hereto in its entirety. The reference, "The Keccak Code Package," https://qithub.com/XKCP/XKCP, is incorporated by reference hereto in its entirety.

Various terms are used herein in describing various embodiments of the present invention. For convenience, the following terms are included here for reference:

1. SHA-3 The Keccak hash function: The SHA3 hash function NIST standard, as defined in the NIST standards document FIPS-202; SHA-3 Standard: Permutation-Based Hash and Extendable-Output Functions.
2. SHAKE: The NIST standard Extended Output Function (XOF) defined in the SHA-3 standard publication FIPS-202; SHA-3 Standard: Permutation-Based Hash and Extendable-Output Functions.
3. KMAC: The SHA3 derived Message Authentication Code generator (MAC) function defined in NIST special publication SP800-185: SHA-3 Derived Functions: cSHAKE, KMAC, TupleHash and ParallelHash.
4. MDK: The Master Derivation Key structure. This key-set and unique key identifier is maintained by the transaction server. The MDK is composed of the BDK, and the STK random keys, and the KID, the MDK's unique identifier string.
5. BDK: The Base Derivation Key; part of the MDK key-set. The BDK is distributed to point-of-sale device manufacturers, who use this key to derive unique embedded keys for each device they produce.
6. STK: The Secret Token Key; a part of the MDK, and known only to the transaction processing server. This key is a secret known only to the financial institution processing requests, and used to create a secondary token-key unique to every terminal device, that is used to construct the terminals key-cache.
7. KID: The MDK's unique identifier string. This string is a 32-bit identification number used by the transaction processing server to lookup the correct MDK for a device.
8. KSN: The Key Serial Number. This is a 128-bit unique identifier string and counter composition. Each terminal device contains a unique KSN, comprised of the MDK's KID, the manufacturer identity string, the terminals device identity string (DID), and a 32-bit transaction counter.

9. DID: The terminal device's unique identification string. The DID is a multi-part identification string. The first half of the 64-bit string are the manufacturer identity string and protocol flags, and the second half, the terminals unique 32-bit identity string.
10. KTC: The Key Transaction Counter. The terminals internal transaction counter, an unsigned 32-bit monotonic counter that increments every time a transaction key is used from the time the terminal is first initialized.
11. EDK: The Embedded Device Key. The unique derivation key that is securely embedded on each terminal device, and derived from the BDK. The EDK is set for the lifetime of the terminal device, and need never be updated, regardless how many transaction keys are generated by the terminal.
12. TKC: The Transaction Key Cache. The set of keys residing on the terminal device. The size of the key cache can be changed using the key cache multiplier, but by default is set to: 42*128-bit keys at a 128-bit security setting, 34*128-bit keys as a 256-bit security setting, and 21*128-bit keys at a 512-bit security setting.
13. TSM: The Token Mac String. A string used to initialize the KMAC state. Used in token exchange authentication. This string is passed to the KMAC customization parameter, and initializes the KMAC state to a unique set of values. The TSM is derived by concatenating the client's KSN and the KMAC formal algorithm name.
14. CTOK: The Custom Token string. Used in the client token-key calculation, and consists of the implementation name, the client's DID, and the token request counter, which is the transaction key counter divided by the key cache size.
15. PRF: The Pseudo Random Function. HKDS uses the SHAKE XOF function as the primary PRF.
16. Key Stream: A key-stream is a stream of pseudo-random bytes that is XOR'd with a plaintext to create a cipher-text output in a stream cipher configuration.
17. Cryptographic Key: An array of random or pseudo-random bytes that are used to key a cryptographic function, such as a MAC or symmetric cipher.
18. Cryptographic Strength: The computational cost of the best-known attack against a cryptographic function or key size.
19. Derivation: A cryptographic process that is used to derive one value from another, as in using one cryptographic key, to derive a second cryptographic key.
20. Personal Account Number (PAN): An identification number, typically signifying an account number used by the card holder and issued by a financial institution.
21. Personal Identification Number (PIN): A secret identification number, a shared secret used by an account holder and issued by a financial institution. Used to validate authorized account usage.
22. Secure Cryptographic Device (SCD): A device that provides both physically and logically protected cryptographic services and storage. The SCD module may be integrated into a terminal device used to remotely transact financial services, such as a point-of-sale device (POS), or an automated teller machine (ATM).

Features of the various embodiments of the above-identified system and method described herein can be modeled and/or effected and/or controlled by a general computer, special purpose computer, a processor, and a smart or other device having a processor. Embodiments of the present invention can be on a portable storage medium and operate therefrom. Embodiments of the present invention can be stored on portable or extraneous or integrated storage device or medium, and can be removable from the device or medium and/or executable via the device or medium.

The modifications listed herein and other modifications can be made by those in the art without departing from the ambit of the invention. Although the invention has been described above with reference to specific embodiments, the invention is not limited to the above embodiments and the specific configurations shown in the drawings. For example, some components shown can be combined with each other as one embodiment, and/or a component can be divided into several subcomponents, and/or any other known or available component can be added. The processes are not limited to those shown in the examples. Those skilled in the art will appreciate that the invention can be implemented in other ways without departing from the substantive features of the invention. For example, features and embodiments described above can be combined with and without each other. The present embodiments are therefore to be considered in all respects as illustrative and not restrictive. Other embodiments can be utilized and derived therefrom, such that structural and logical substitutions and changes can be made without departing from the scope of this disclosure. This Specification, therefore, is not to be taken in a limiting sense, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations and/or variations of various embodiments. Combinations of the above embodiments, and other embodiments not specifically described herein, will be apparent to those of ordinary skill in the art upon reviewing the above description.

What is claimed is:

1. A system for secure digital payment transactions, comprising:

a client terminal processor device; and a transaction server, wherein the client terminal processor device communicates with the transaction server, and wherein the client terminal processor device processes computer-readable instructions to effect a client initialization process, including causing the client terminal processor device to:

send a token request packet from the client terminal processor device to the transaction server, wherein the token request packet requests an encrypted token key;

wherein the transaction server is further operable to:

in response to receiving the token request packet, generate the encrypted token key by the transaction server using a secret token key (STK) residing in an associated master derivation key (MDK), wherein the STK is concatenated with a custom token string (CTOK), the client terminal processor device unique identity string (DID), an implementation name, and a token request counter to make a concatenated array;

utilize the concatenated array to generate a separate PRF key;

generate a transaction key cache based on the PRF key; and erase the encrypted token key.

2. The system of claim 1, wherein the associated master derivation key is stored on the server.

3. The system of claim 1, further comprising a transaction counter, wherein the transaction counter is a monotonic counter used by the client terminal device to count the number of transaction keys that have been used.

4. The system of claim 3, wherein the transaction counter is divided by the size of a client terminal processor device key cache to calculate the token request counter.

5. The system of claim 4, wherein the use of the token request counter and the client terminal processor device unique identity string as a part of the PRF key provides that a unique token is generated each time a token request is made and the secret token key is known only to the transaction server.

* * * * *